L. A. SUBERS & E. MOSMAN.
AUTOMATICALLY ACTING MACHINE FOR MAKING A TWISTED CORD OR THREAD AND FOR REELING THE SAME.
APPLICATION FILED MAY 16, 1910.
1,039,211.
Patented Sept. 24, 1912.
12 SHEETS—SHEET 1.
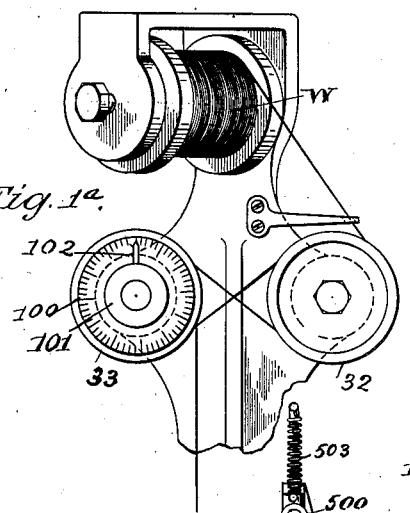
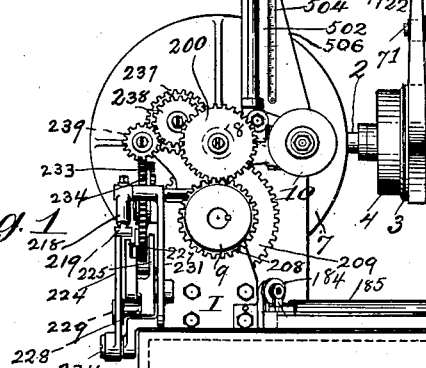
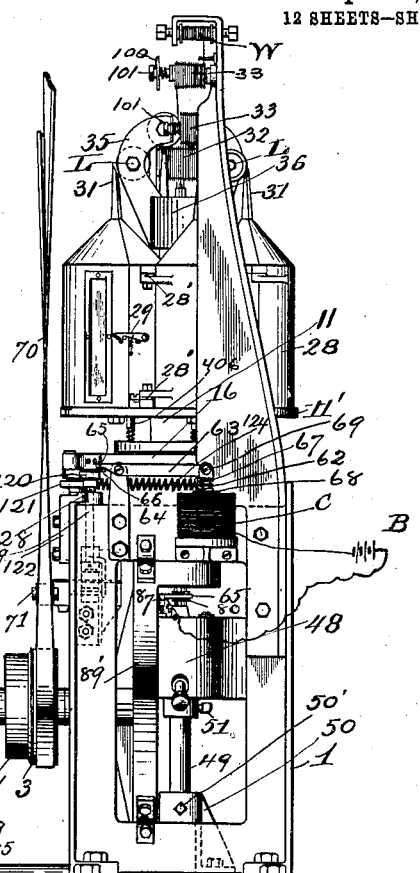

L. A. SUBERS & E. MOSMAN.
AUTOMATICALLY ACTING MACHINE FOR MAKING A TWISTED CORD OR THREAD AND FOR REELING THE SAME.
APPLICATION FILED MAY 16, 1910.
1,039,211.
Patented Sept. 24, 1912.
12 SHEETS—SHEET 2.
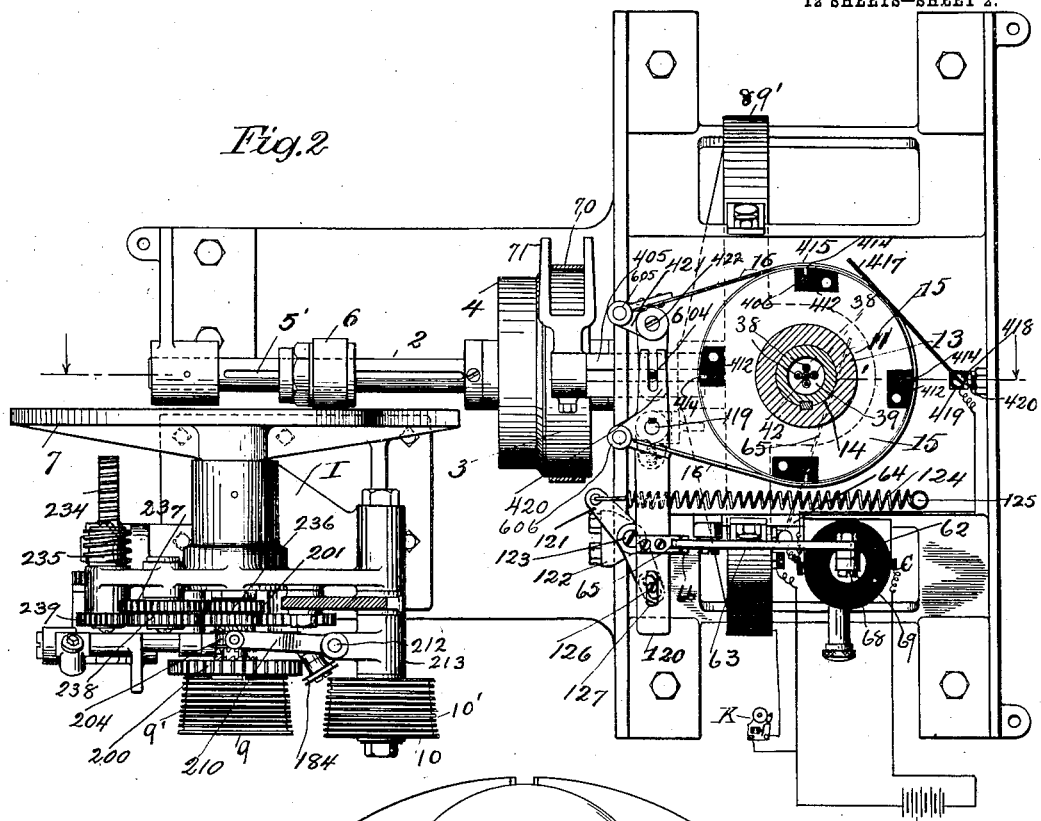
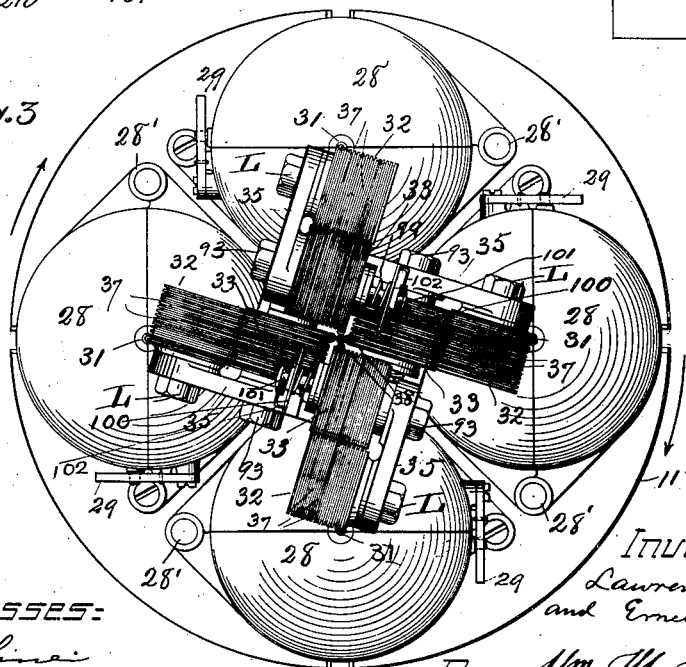

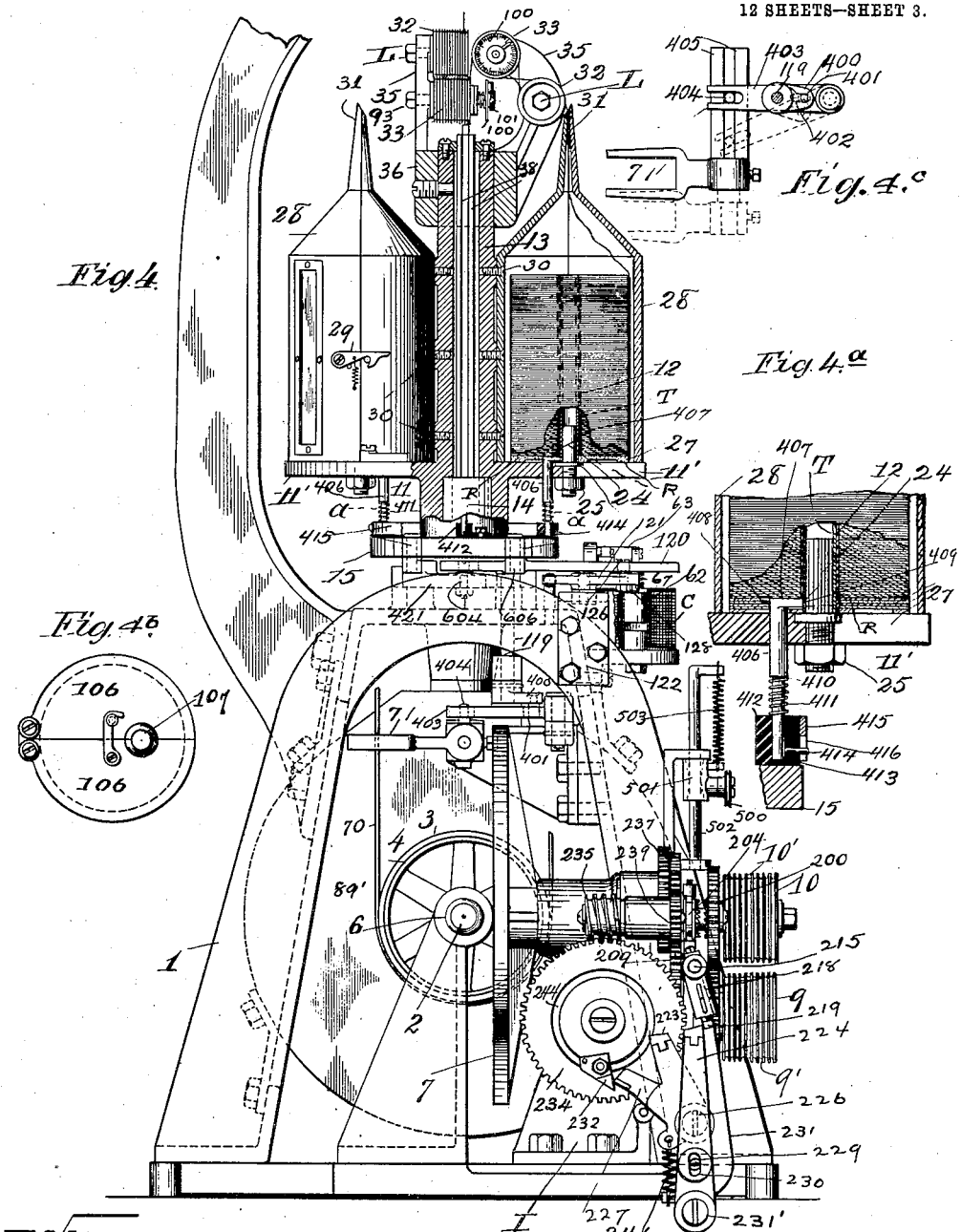

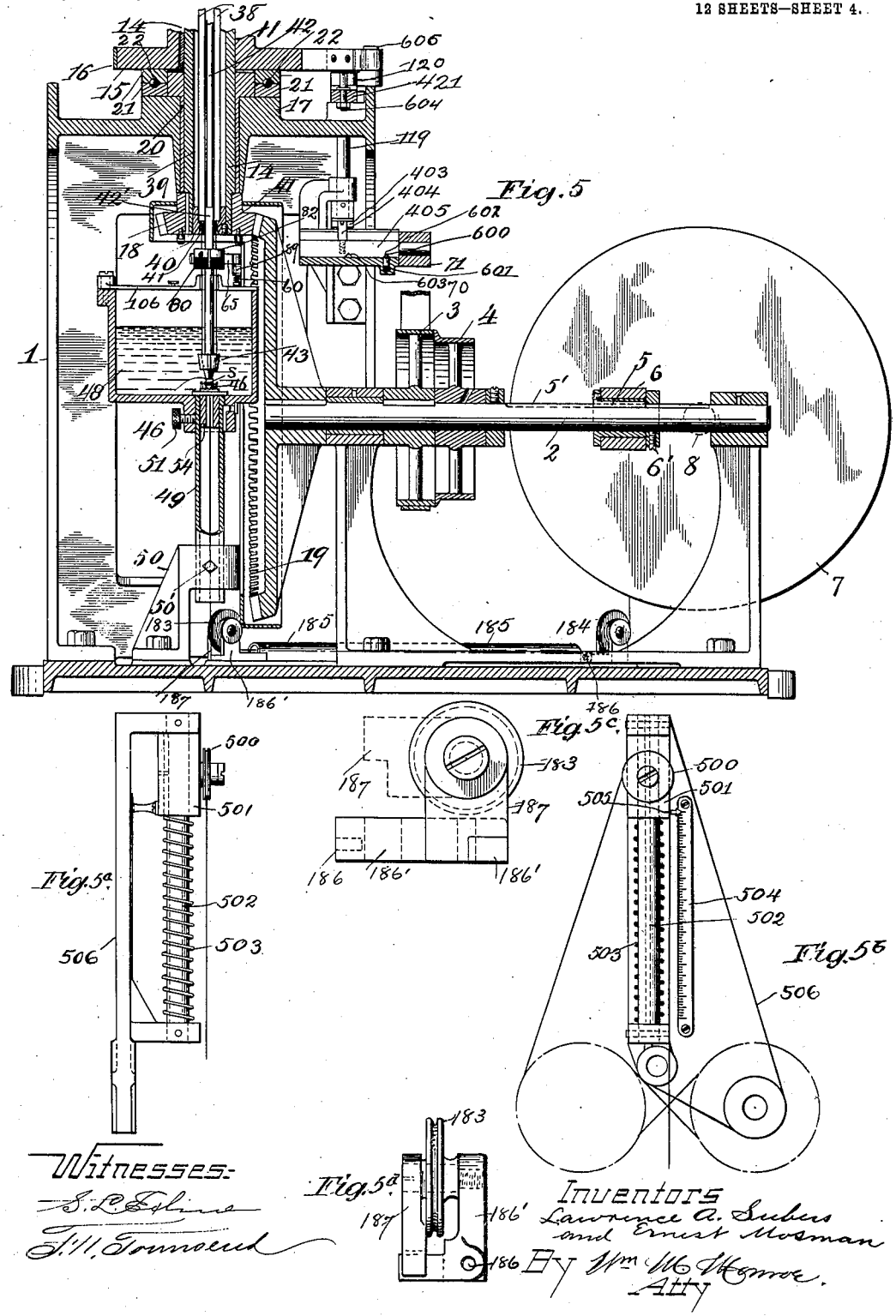

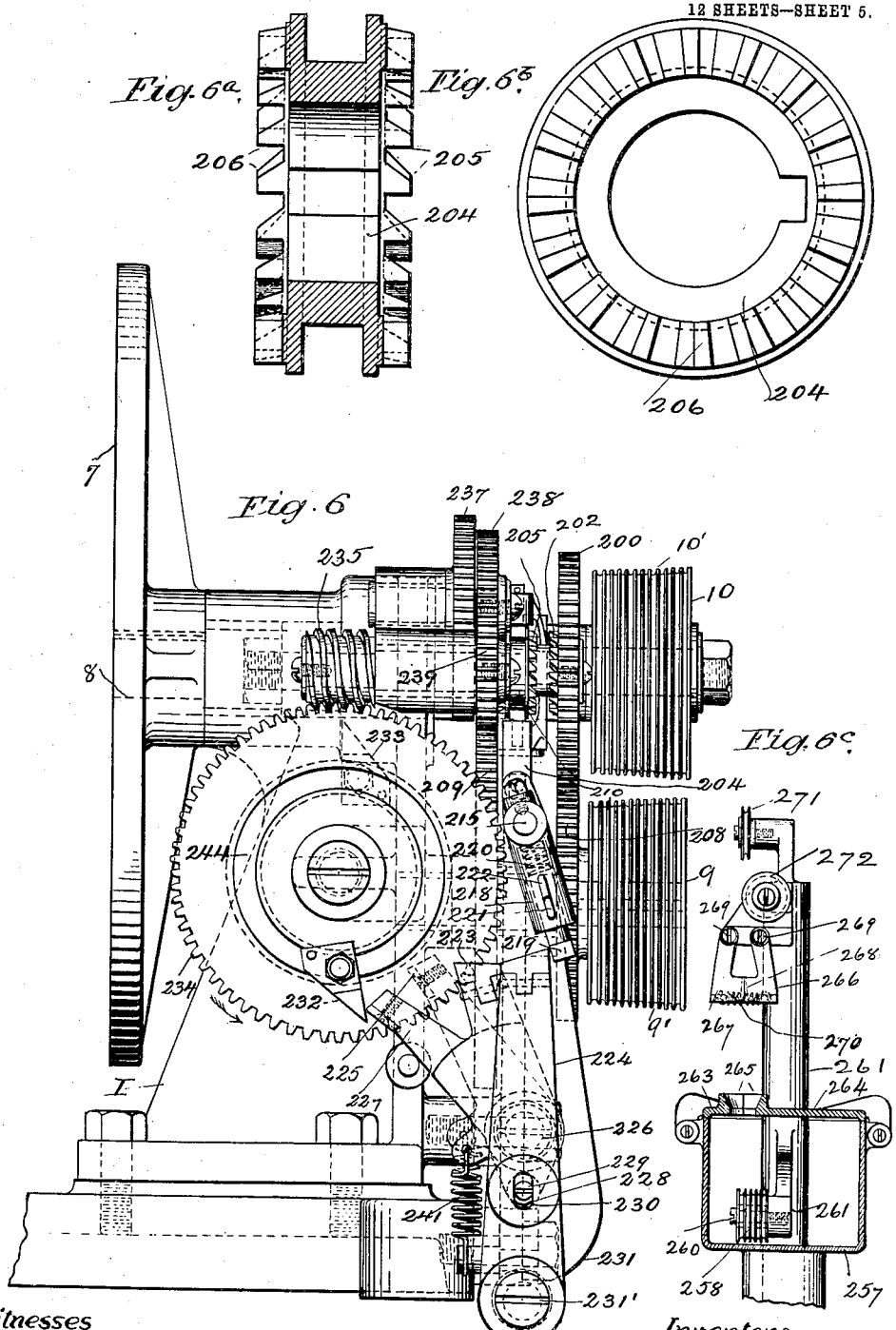

L. A. SUBERS & E. MOSMAN.
AUTOMATICALLY ACTING MACHINE FOR MAKING A TWISTED CORD OR THREAD AND FOR REELING THE SAME.
APPLICATION FILED MAY 16, 1910.
1,039,211.
Patented Sept. 24, 1912.
12 SHEETS—SHEET 6.
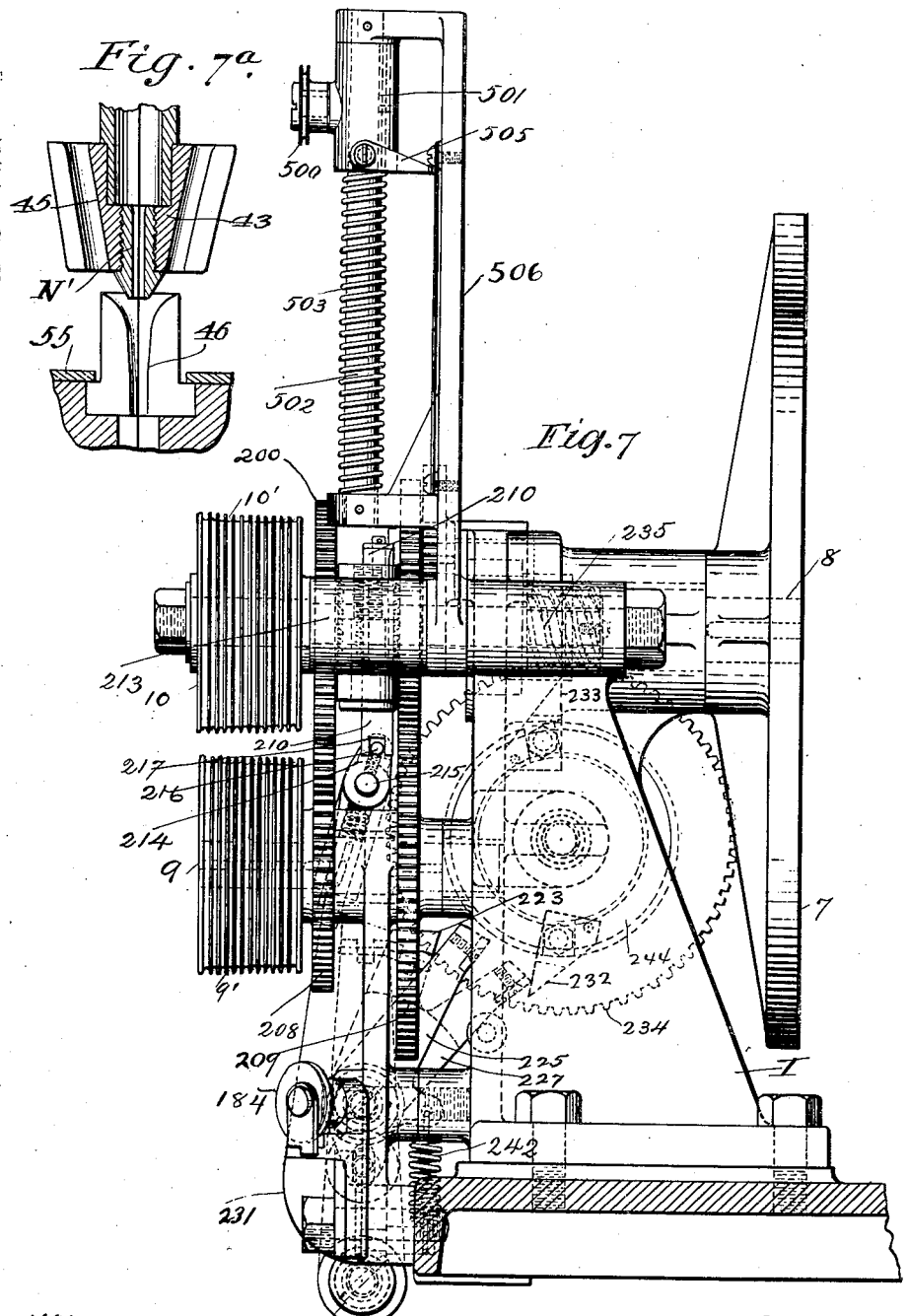

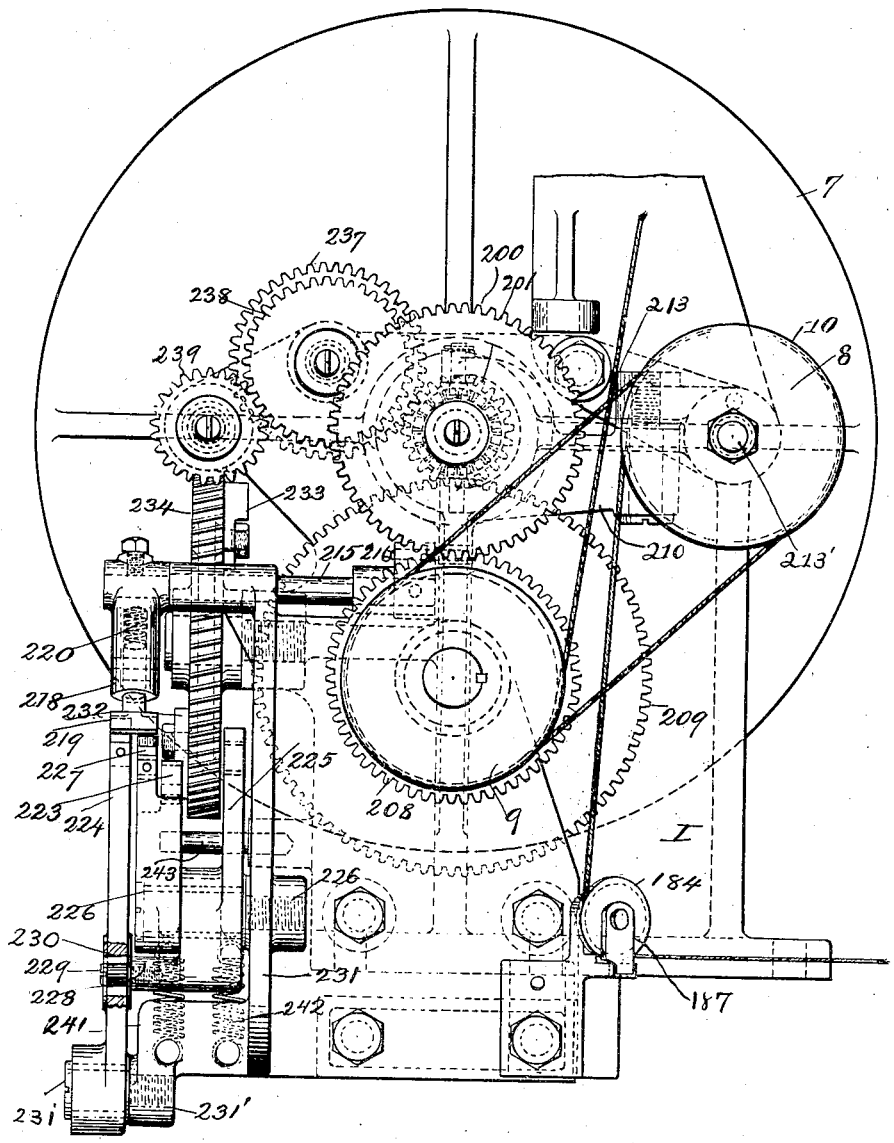

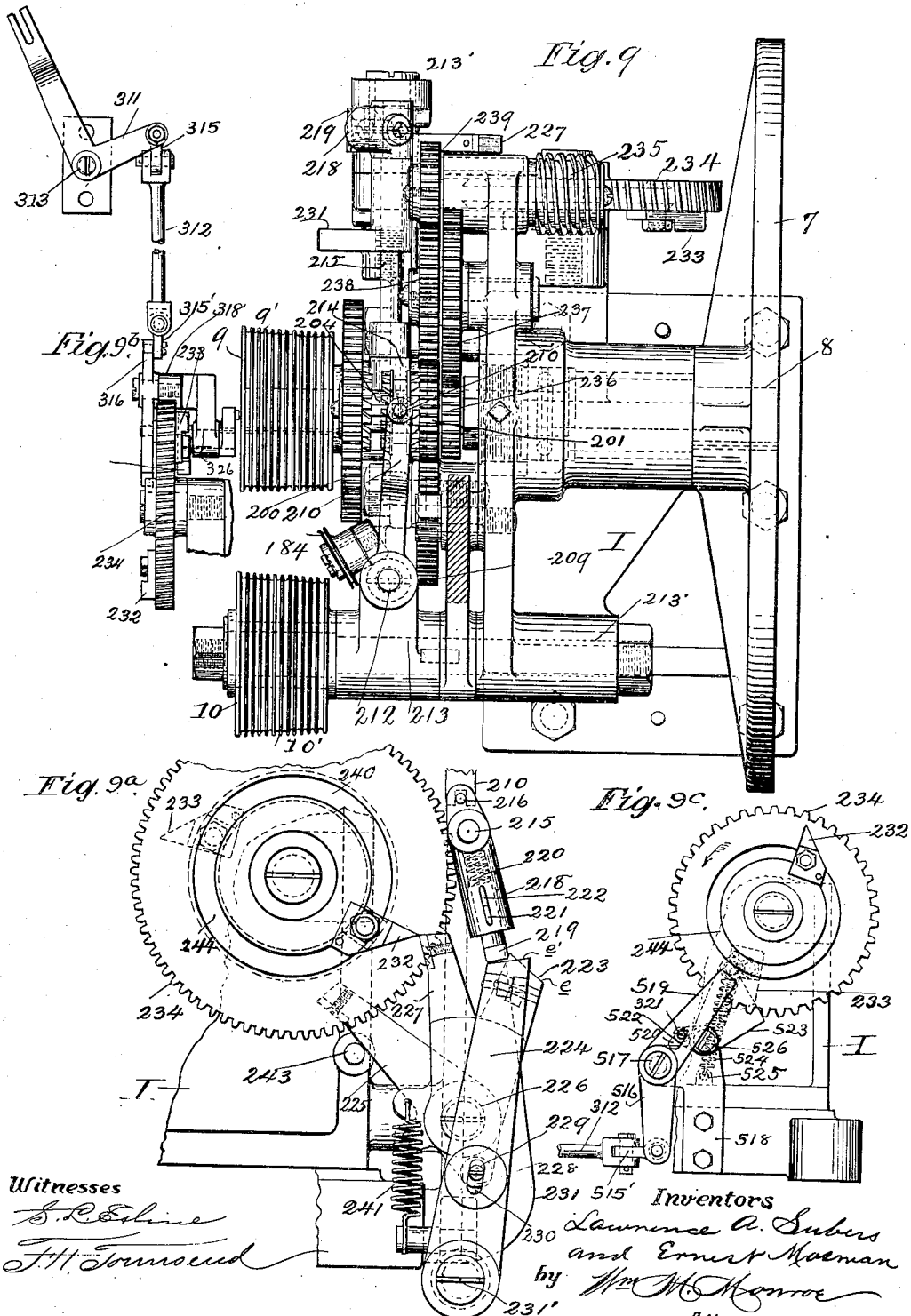

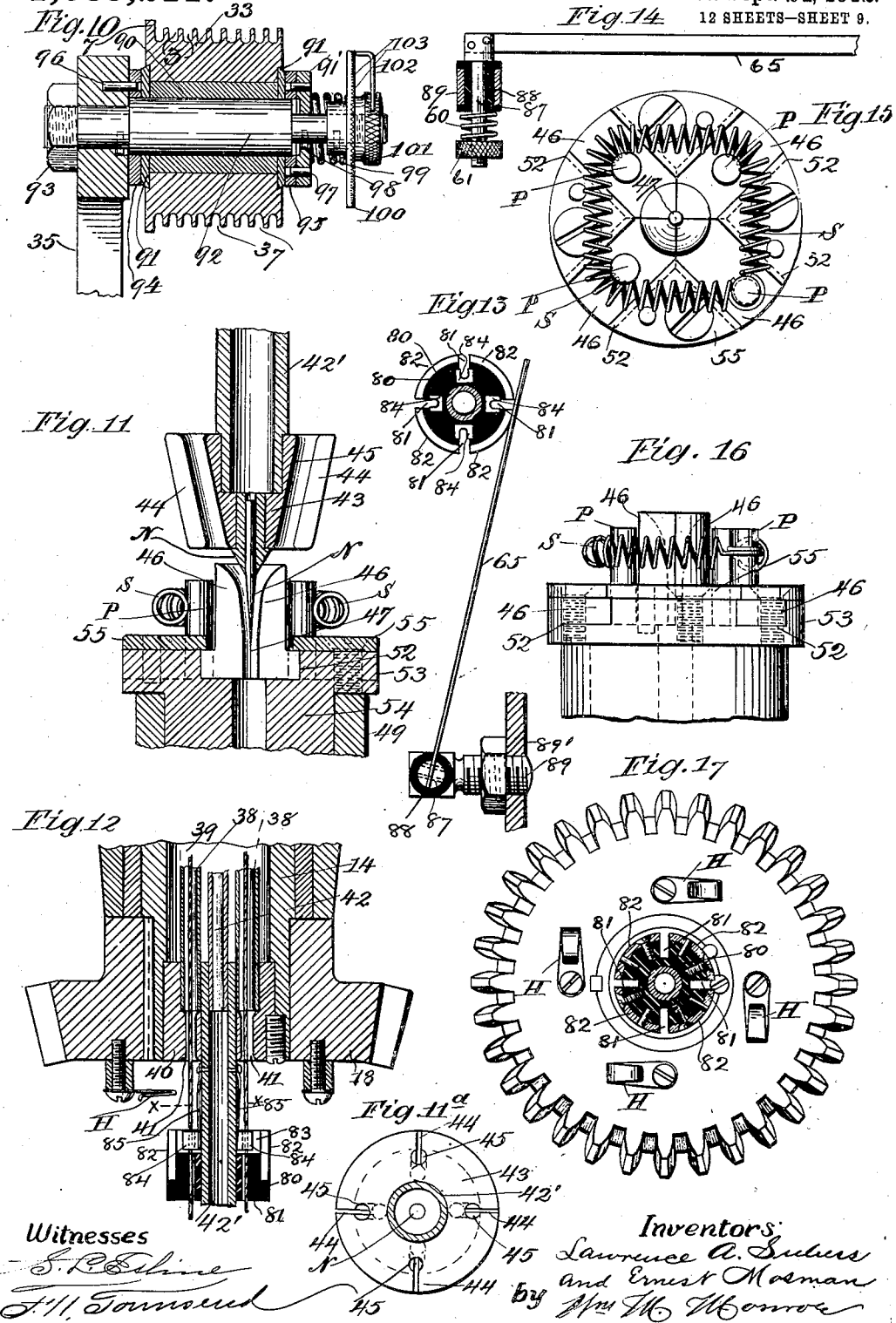

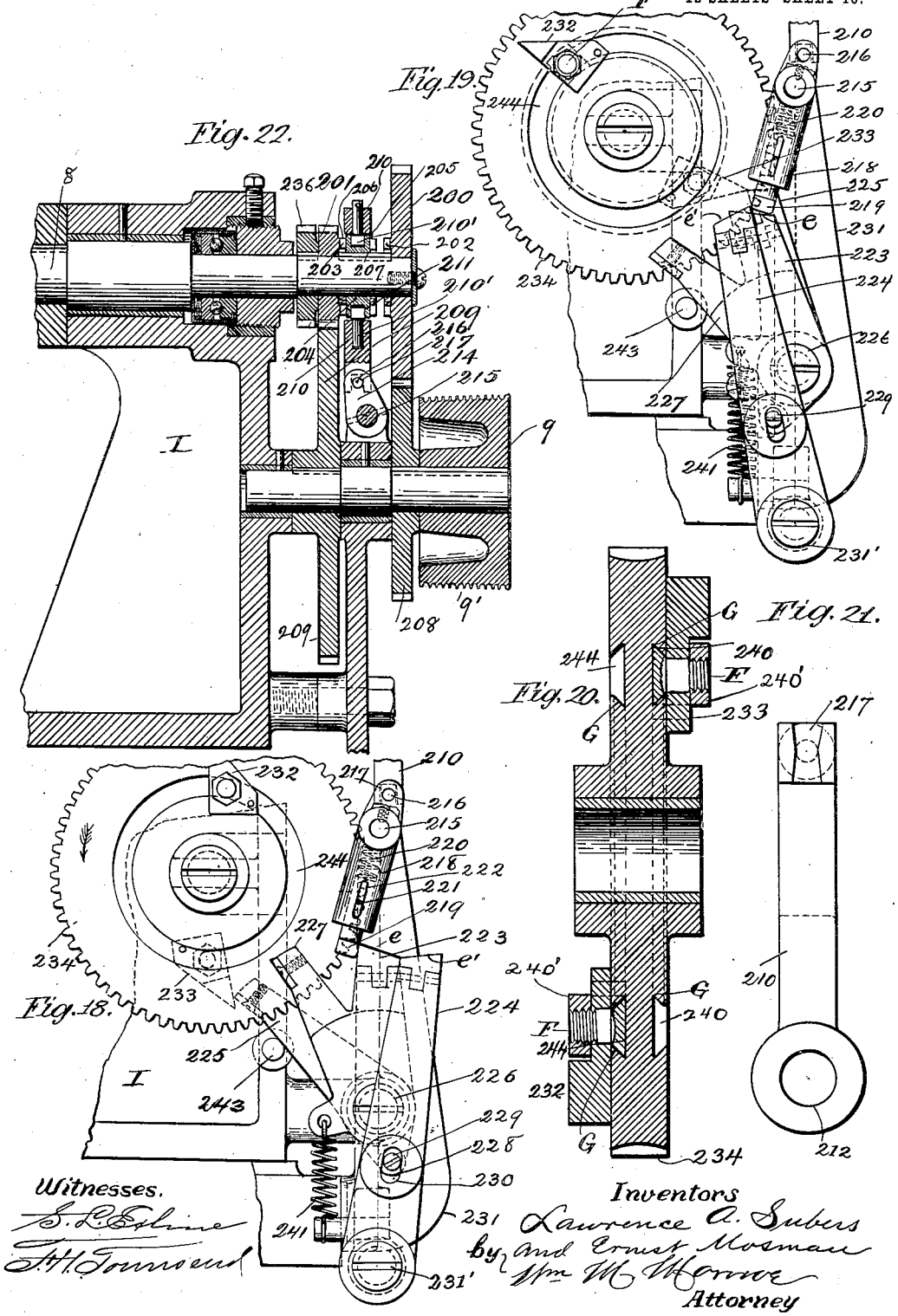

L. A. SUBERS & E. MOSMAN.
AUTOMATICALLY ACTING MACHINE FOR MAKING A TWISTED CORD OR THREAD AND FOR REELING THE SAME.
APPLICATION FILED MAY 16, 1910.
1,039,211.
Patented Sept. 24, 1912.
12 SHEETS—SHEET 11.
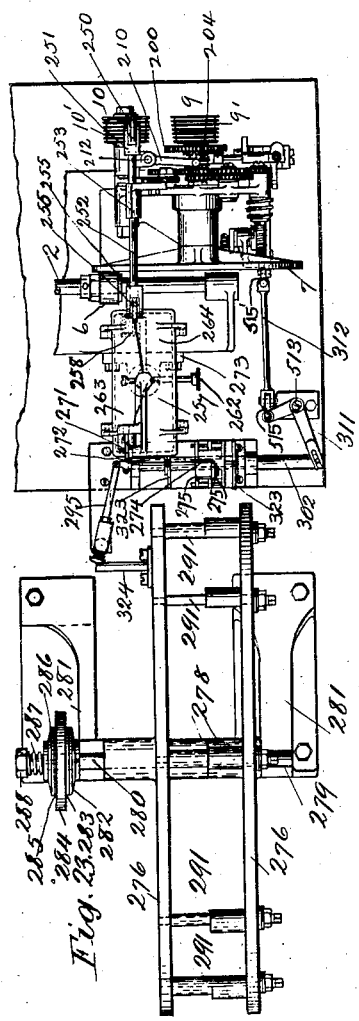
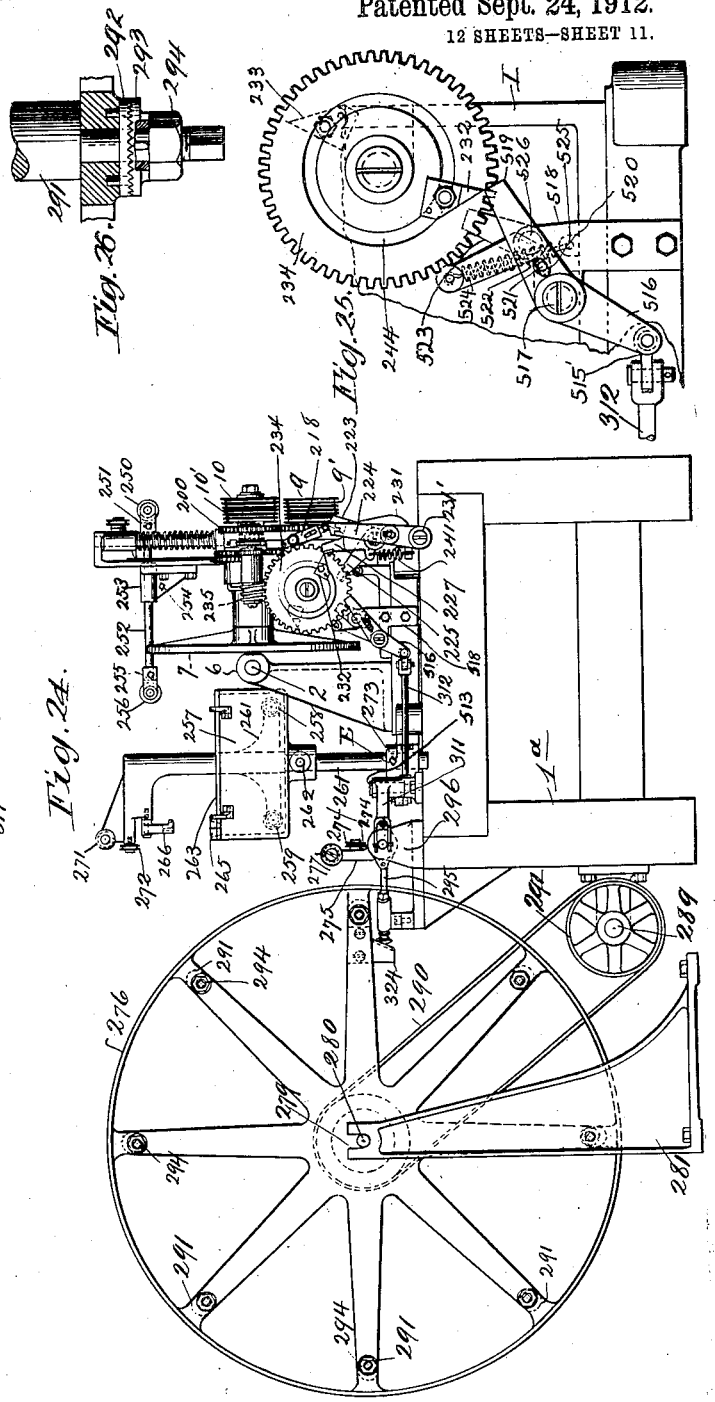
Witnesses:
Inventors
Lawrence A. Subers
and Ernest Mosman
by Wm M Monroe
Attorney

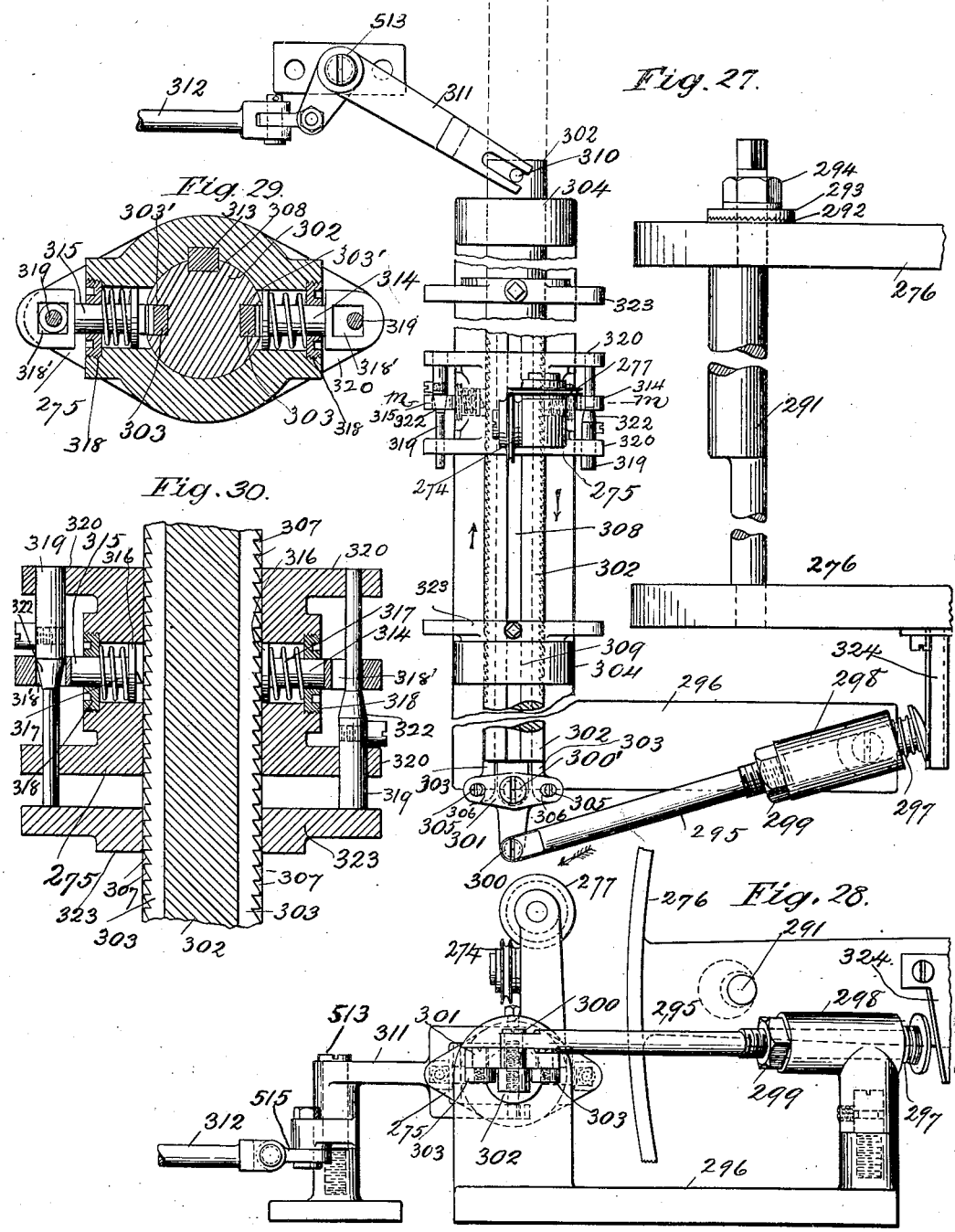

UNITED STATES PATENT OFFICE.

LAWRENCE A. SUBERS AND ERNEST MOSMAN, OF CLEVELAND, OHIO; SAID MOSMAN ASSIGNOR TO SAID SUBERS.

AUTOMATICALLY-ACTING MACHINE FOR MAKING A TWISTED CORD OR THREAD AND FOR REELING THE SAME.

1,039,211. Specification of Letters Patent. Patented Sept. 24, 1912.

Application filed May 16, 1910. Serial No. 561,693.

*To all whom it may concern:*

Be it known that we, LAWRENCE A. SUBERS and ERNEST MOSMAN, citizens of the United States, and residents of Cleveland, in the county of Cuyahoga and State of Ohio, have invented certain new and useful Improvements in Automatically-Acting Machines for Making a Twisted Cord or Thread and for Reeling the Same, of which we hereby declare the following to be a full, clear, and exact description, such as will enable others skilled in the art to which it appertains to make and use the same.

The objects of the invention are to provide an automatically operating machine for making a twisted and coated cord or thread and for reeling the same. This machine includes automatically acting devices for twisting together the strands, yarns or other fibrous elements which comprise a cord or thread in such a manner as to form said cord or thread under a controllable amount of tension, and so arranged as to give to each yarn an equal amount of stretching prior to twisting the yarns together and to give the finished cord or thread a predetermined amount of stretching not sufficient to part or weaken the fibers, but adapted to produce in a continuous manner a cord or thread which when twisted will have a uniform predetermined amount of stretching applied to it throughout its length. Such a cord or thread after stretching is only capable of a predetermined amount of further extension and is designed to be applied in a fabric while still under a predetermined tension. A fabric formed of such cords or threads all equally stretched will be possessed of a greater amount of tensile strength than a fabric in which the component cords or threads running in one direction have a less amount of stretching from the cords or threads running in a different direction, consequently the first mentioned fabric formed from threads made by these devices, must necessarily extend or elongate alike in all directions. This is essential in a tubular fabric where if in any part a cord or thread should be more extensible than in another part or parts the fabric would either expand, contract, elongate or shorten unequally when placed under internal pressure, external compression or other stress, and there would not be a uniform action on all the cords or threads. Hence the pressure or stress received upon the cords or threads would tend to affect them in an irregular manner, and the strength of the fabric would be correspondingly weakened, since some of the cords or threads would give way before others.

Further objects of the invention are to provide automatically acting means for preventing the catching and breaking of the several yarns or strands as they are drawn from the yarn tubes, which are inclosed in suitable receptacles, and to provide necessary rotatable supporting and guiding means, for the several yarns, and also a stationary single twist holder provided with a single perforation through which all the yarns pass from said rotating guiding means while being twisted together, the twist holder being separable under pressure to permit a knot or other obstruction to pass through without breaking the cord or thread, and also means for giving vertical adjustment to the twist holder, whereby the angle of the twist can be varied relatively to the guiding means aforesaid.

It also includes a receptacle for the coating material in a substantially fluid or viscous condition, and means for adjusting the receptacle relatively to the twist holder so that the twist holder can be exposed above the coating material in the receptacle for accessibility thereto for adjustment or change in the angle of the twist, or for cleaning it if it should become clogged or out of order.

Further objects are to provide suitable tension devices for the yarns and a pulling device adapted to draw the finished cord or thread against the resistance of the tension devices.

The invention includes also means for obtaining a smooth, even, and uniform character of twist of the component yarns and to prevent any one yarn from becoming centrally located and the others from twisting upon it.

A further object is to provide means for automatically stopping the machine when any one yarn or all of the yarns or the finished cord or thread is broken, and to prevent the tangling of the yarns or fouling of the mechanism. This automatically acting means for stopping the machine is designed to remove the belt from a driving to a loose pulley and also to operate a braking device.

Further objects are to provide automatically acting means for stopping the machine when a yarn tube becomes empty or nearly so.

The invention further comprises instrumentalities for permitting the tension wheels to operate without the use of oil which coming into contact with the yarns would interfere with the successful vulcanization thereof.

The invention further comprises the specific construction of the rotating head carrying the yarn tubes, the removable standard carrying the tension devices and the arrangement of the tension devices thereon and the specific construction thereof.

The invention further comprises a separate inclosure or receptacle for each yarn tube and means for preventing the yarns from catching in the yarn tube receptacles while being unwound therein, and means for permitting free delivering of the yarns to the guides and twist holder, so that no possible variation in tension may be caused by want of the free delivery of the several yarns thereto.

Further objects are to provide means for automatically varying at predetermined intervals or time the speed of rotation of the cord or thread pulling device in relation to the speed of rotation of the head containing the yarn tubes which remains constant. By this means a thread is formed which has regularly recurring zones or portions in which a predetermined number of twists per inch are formed alternating with the intermediate zones or portions in which a different number of twists per inch are formed. This is accomplished by the automatically and regularly recurring changes in speed with which the thread is drawn through the twist holder, from the tubes in the revolving head and includes the mechanism whereby these changes in speed occur at predetermined intervals and extend through predetermined periods of time, so as to give a predetermined length to each zone in the thread, all yarns composing this thread being under an approximately constantly equal tension while being twisted into a finished cord or thread. It may be mentioned that a fabric formed of this thread will contain zones or portions which are more extensible or can be stretched more than other portions, and may be located wherever the same may be desired.

Further objects are to provide means for coating the exterior of the twisted thread to any predetermined thickness and for removing any superfluous coating therefrom.

Further objects of the invention are to provide a thread reel upon which the finished thread is wound and by means of which the separate zones or portions differently twisted can be kept separate from each other, and from said reel the thread may be wound upon a tube, spool or any other suitable holder from which the finished cord or thread may be formed into a fabric. Means are also provided whereby the portions of the reel on which the zones of thread containing the greatest number of twists to the inch can afterward be relaxed so as to make these portions or zones as expansible as possible after they are incorporated in a fabric. The same device can also be used to stretch the zones of thread which lie thereon.

The invention further comprises the combination and arrangement of the various operating parts and construction of preferred forms of details as hereinafter described, shown in the accompanying drawings and specifically pointed out in the claims.

In the accompanying drawings Figure 1 is a front elevation of a twisting machine wherein the automatically acting devices herein described are incorporated; Fig. 1ª is a perspective view showing a reel adapted to hold a wire or a fibrous cord or thread which can be used as a core upon which the yarns can be wound or twisted if desired; Fig. 2 is a horizontal section of the machine on line $a \ldots a$ Fig. 4 with the rotatable head for the yarn tubes removed; Fig. 3 is an enlarged view of the rotatable head for the yarn tubes, showing the tension devices rotatable therewith; Fig. 4 is a vertical longitudinal section of the rotatable head of the device and end view of the lower part of the machine; Fig. 4ª is an enlarged section of a portion of the bottom of a thread tube showing the resilient cushion therein; Fig. 4ᵇ is a plan view of the cup for coating material, through which the yarns pass prior to twisting and in which they are twisted; Fig. 4ᶜ is a plan view of the belt shifter; Fig. 5 is a vertical longitudinal section through the lower portion of the twisting machine showing the operating means for the various parts and the coating material reservoir and twist holder and support for the various parts; Fig. 5ª is a side elevation of the tension twisting device; Fig. 5ᵇ is a front elevation thereof; Fig. 5ᶜ is a side elevation of the thread guide mounted on the base of the machine; Fig. 5ᵈ is an edge view thereof; Fig. 6 is an enlarged elevation in detail of the friction disk and thread pulling drums, showing the gears for changing the speed of the thread pulling drums, the operating clutch and clutch shifting mechanism; Fig. 6ª is a longitudinal section of the clutch; Fig. 6ᵇ is a face view of one side thereof; Fig. 6ᶜ is a vertical section of the coating material tank through which the thread passes to the reel; Fig. 7 is an elevation of the same mechanism shown in Fig. 6 showing the opposite edges of the parts; Fig. 7ᵃ is a vertical central section of twist former; Fig. 8 is a front view of the same portion of the device which is adapted to the production of different twisted zones in the thread; Fig. 9 is a side elevation thereof; Fig. 9ᵃ is a side elevation of the worm wheel and single and double levers and shifting lever which operate the speed changing clutch for the thread pulling drums; in the position in which the slow speed driving gear is employed; Fig. 9ᵇ is a plan view of the worm wheel, and shifting levers; Fig. 9ᶜ is a side elevation of the worm wheel showing levers for operating the shifting carriage which controls the winding of the thread on the reel; Fig. 10 is a longitudinal section of one of the rotatable grooved tension drums; Fig. 11 is a vertical longitudinal section of the twist former and separable twist holder showing the needle foundation upon which the twist is formed; Fig. 11ᵃ is a plan view of the twister former; Fig. 12 is a vertical longitudinal section of the bevel gear which rotates the head and of the steel tube secured therein to the upper end of which the head supporting the yarn tubes is secured. In this view the vertical guides for the several yarns are shown and the means for closing the contacts of an electric circuit when one or more of the yarns break or separate. Fig. 13 is a transverse section on line $x \ldots x$ Fig. 12 showing the several contact segments and brush adapted to engage therewith; Fig. 14 is a longitudinal section of the insulated pivotal support for said brush; Fig. 15 is a plan view of the separable twist holder showing the closing spring therefor; Fig. 16 is a side elevation thereof; Fig. 17 shows the bottom of the bevel gear which operates the rotatable head and shows the segmental contacts in transverse section; Fig. 18 is a side elevation of the worm wheel showing the parts in position when the high speed gear is in operation to drive the drums; Fig. 19 is a similar view showing the positions of the parts just before the shifting lever moves to throw in the slow speed; Fig. 20 is a transverse section of the worm wheel and dogs thereon; Fig. 21 is a bottom view of the clutch fork; Fig. 22 is a vertical section through the active pulling drum and speed gears and clutch therefor; Fig. 23 is a plan view of the reel showing the mechanism for guiding the thread thereto in such a manner as to apply different zones to different portions thereupon, whereby each zone is always placed in a certain position upon the reel; Fig. 24 is a side elevation thereof; Fig. 25 is an enlarged side elevation of the worm wheel and levers for operating the mechanism for feeding the thread to the reel; Fig. 26 is a transverse section for one of the reel flanges showing a locking device for one of the eccentric rods; Fig. 27 is an enlarged view of the automatic feeding device for feeding the thread to the reel; Fig. 28 is an end elevation of the same; Fig. 29 is an enlarged transverse section thereof on the line $m \ldots m$ of Fig. 27; Fig. 30 is a longitudinal central section of a portion thereof including the thread carrier.

In these views 1 is one form of a frame or standard upon which the moving parts of the twisting machine may be mounted. 1ᵃ is a stand or support therefor.

2 is the driving shaft provided with the fixed and loose pulleys 3 and 4 respectively, upon these pulleys a belt 70 is moved alternately by means of a belt shifter fork 71. (See Figs. 1, 2, 4, and 5.) Upon this shaft 2 is adjustably secured by means of a spline 5 in one portion and groove 5' in the other portion a friction driving roll 6 adjustable on the shaft 2 by means of a set screw 6', which operates against the friction disk 7 mounted in turn upon shaft 8 at right angles to the shaft 2.

9 and 10 are pulling drums preferably provided with differential grooves 9' and 10' respectively, by means of which the finished cord or thread is drawn through the machine against the resistance of the tension devices. One of these pulling drums 9 is operatively connected with the friction disk shaft 8 by means of change gears 200, 201, 208 and 209. (See Figs. 1, 6, 7, 9 and 22).

Upon the frame 1 is mounted the head 11 which is rotatable upon the frame and is provided with a flange 11' which supports the tubes 12, 12, made of paper or any other suitable material, upon which are wound the yarns which are to be twisted together to form the desired cord or thread. These tubes 12, 12 and the yarn upon them are usually designated "yarn tubes." The head is provided with a vertical hollow stem 13. This head is preferably formed of light material such as aluminum and is provided with a second lower brake flange 15, against which a brake band 16 engages. Rotatable with this head and secured thereto is shown a steel tube 14, which has a vertical bearing in a horizontal portion 17 of the frame 1. (See Fig. 5). Secured to the lower end of the tube 14 is a pinion or bevel gear 18, which is engaged by a corresponding larger bevel gear 19 mounted upon the shaft 2, and therefore is adapted to rotate the head 11 at a high rate of speed. A ball bearing for the head is shown in Fig. 5 where 20 is a bushing preferably of bronze in which the tube rotates, 21, 21, are the upper and lower halves of the ball bearing and 22, 22, are the steel balls. In this manner the head revolves with the minimum amount of friction and wear of the parts and hence with reduced danger of change in alinement of the operating parts.

It will be seen that while the relative speeds of the shaft 2 and head 11 are fixed by the relative diameters of the gears 18 and 19, the speed of the friction disk relative to the twisting speed can be varied by radial adjustment of the friction roller 6 and the friction disk 7.

Upon the rotatable head 11 and flange 11' thereon are supported the yarn tubes 12, 12, which are forced over brass tubes T, T, secured to pins 24, 24, which are in turn secured to the flange 11' by means of nuts 25, and shoulders 26 sunken in the flange. One end of each tube of yarn rests directly upon a felt or other resilient cushion 27, 27. This cushion can be made to conform to the shape of the mass of yarn wound on each tube which is uneven on its bottom, so that the yarn will not get underneath and catch or become tangled in such a manner as to break. This would often occur if the end of the tube of yarns rested directly upon a metal surface. This result is accomplished by means of the clamping nuts 25 which are tightly secured to retain the tubes in place while revolving at a high speed and also serves to prevent the tubes of yarn from getting underneath the end of the tube thereof. The felt cushions may be composed of several layers of felt and have outer and inner rings R, R, of felt next to the flange 11'. Made up in this manner the felt washers when compressed by the tubes of yarns have resilience enough to conform themselves to the irregular shape of the bottom of the tube of yarns, and thus prevent the yarns when unwinding from catching underneath. The tubes whereupon the yarn is wound, are tightly forced over the tube standard T, T, so as to offer resistance and permit compression of the lower end of the yarn. At the high rate of speed at which this rotatable head and yarn tubes thereon rotate the yarns in passing from the yarn tubes to their respective tension drums would be caused to fly out from centrifugal force, and hence would become entangled with themselves or with parts of the machine, and therefore the tension could not be controlled and yarns might become broken if not protected. Hence each yarn tube is provided with a separate chamber 28, 28 having a covered top so that the yarns cannot escape from control. These chambers are formed in halves hinged together at 28', 28', and closed by a latch 29, so that the yarn is confined therein. A conical tube 31 leads from the top of each chamber 28, which serves as a guide to the yarn, and the open end of each conical tube is approximated as closely to the adjoining tension drum 32 as possible, so that centrifugal force will have the least possible influence on the yarns. The chambers 28, 28, are secured to the upper extension 13 of the central stem by screws 30, 30. The yarn tubes are readily put in place by opening the chambers on their hinges.

The tension rolls 32 and 33 are mounted upon the standards 35, 35, which are integral with the sleeve 36, which is mounted upon the upper end of the stem or spindle 13, so that all the tension rolls can be put into place or removed together. As shown in Fig. 3 the tension rolls 32 and 33 are arranged in pairs and have circumferential grooves 37, 37, therein, so placed that the yarns can be passed from one roll to the other until all the grooves are filled and the last used groove registers with one of the guide tubes 38, 38, which are preferably inclosed in the central steel tube 14. The guide tubes 38 are equal in number to the yarns preferably four, and are equally spaced in the central opening 39 in the tube 14. They are mounted in a metal head or closure 40 which is perforated at 41, 41 for the passage of the yarns and which is itself secured to the lower end of the tube 14. The tension rolls 32 are preferably stationary and the rolls 33, are preferably rotatable on their axis, and are mounted upon one side or the other of the standard 35 according to the direction of rotation of the head. In Fig. 3 they are shown on the left as the head revolves to the left, and hence receive the thrust of the tension rolls due to the centrifugal force generated by the rotary movement of the head.

In Fig. 10 one of the rotatable tension rolls 33 is shown in longitudinal section. This rotating roll has a predetermined number of parallel, equidistant, circular grooves 37, 37, on its outer periphery. This roll is preferably made of aluminum for lightness to minimize the pressure against its end bearing caused by centrifugal force when the head is rapidly rotated, and is provided with a bushing 90 composed of specially treated wood or other anti-friction material, which required no lubrication so that the use of oil can be dispensed with, since oil would interfere with the process of vulcanization if it should come in contact with the yarns. At each end a hardened steel thrust washer 91 is employed secured to the aluminum roll which may be recessed to receive it. This drum rotates on a pin 92 secured by means of a nut 93 to the standard 35, and next to the bracket is placed an anti-friction washer 94 of specially prepared wood, similar to the bushing 90. A similar anti-friction washer 95 is employed at the other end. The inner thrust washer 94 is stationary and secured by means of a pin 96 to the standard 35, and the outer thrust washer 95 is secured by a pin 97 to the outer steel washer 91' which in turn is slidingly secured to the pin 92 by means of the pin 98. The outer steel washer 91' receives the thrust of a spring 99 forced against it by means of the graduated dial disk 100 and a nut 101. This nut carries a locking and registering spring finger 102, which engages with the teeth 103 on the face of the dial 100. When the nut is screwed down upon the dial the tension roll 33 is compressed between the thrust washers and the amount of tension thereon will be indicated on the dial.

The roll 32 is similar to the roll 33 but is stationary and therefore can be made of aluminum, but is preferably made of hardened and polished steel and secured by a bolt L to the standard 35. The yarn from the tube secured in each chamber passes first over a stationary roll 32 and is wound backward and forward over the grooves 37, 37, in this roll and in the rotatable roll 33 upon which the tension is adjustable. In this manner a definite tension resistance is obtained from the passage of the yarn over the grooves of the stationary roll, and this tension is increased or diminished at will by the number of grooves employed in the stationary roll. This tension resistance can be increased, adjusted and controlled by the use of the rotatable roll 33, in which any given resistance can be obtained by the use of the nut 101 and spring 99, and oilless washers 94 and 95, and oilless bushing 90, and the exact pressure will be indicated in the graduated dial 100 by the finger 102. The action of the oilless washers upon the washers secured to the ends of the drum and the oilless bushing produces a non-changing condition in the resistance, which could not be obtained by the use of oil, since the oil could not be retained continuously and the amount of friction would vary when the machine was in operation.

In Fig. 1ª a horizontal spool W for a central wire or fibrous yarn is shown, the tension drums being the same as those previously described. 42 is a central guide tube which may be used for a central yarn if desired and the lower end of this tube is secured in a larger tube 42' to the lower end of which is secured the vertically slotted twist former or forming cone 43, and the radial slots 44, 44, therein are preferably enlarged at their inner ends at 45, 45, and slant inwardly toward their lower ends to converge the yarns for twisting. In these slots the outer yarns are inserted for guidance, and this disk forms the foundation for the twisting movement. A polished steel needle N is shown secured to a cap N' inserted in the lower end of the central tube 42' and extends vertically downward therefrom. Around this needle the four yarns are twisted. The object in the use of this needle is to prevent one yarn from assuming a central position relatively to the other three yarns so that they will twist upon it when the threads are twisted with a large number of turns per inch. The four strands when twisted together will twist at a certain point on the needle and higher or lower according to the desired number of turns per inch of the finished thread, and also varying with the diameter of the yarns used.

The twisting point of the yarns in order to produce a perfectly smooth thread is held by a twist holder which does not rotate, and through a central opening 47 in which the point of the needle enters, the rapidly rotating yarns are drawn. This holder is spaced a distance from the twist former 43, to permit the yarns guided by the slots and cap described to form a twisting point upon the needle within the opening 47. The number of twists per inch is determined by the speed of the pulling drum 9 relative to the speed of rotation of the head 11, and the diameter of the yarns.

The twist holder is immersed in the cup 48 for rubber or other coating material and is secured in a sleeve 49 adjustable in a bracket 50, by means of a set screw 50'. Again the rubber cup 48 is vertically adjustable upon the sleeve 49 by means of a set screw 51, so that it can be lowered to expose the twisting mechanism therein above the rubber in the cup, when a yarn breaks and must be threaded again in the holder or for any other purpose of adjustment. The rubber cup is provided with a hinged cover in two portions 106, 106 having an eccentrically placed opening 107 through which the yarns pass. The location of this opening is important since on account of its close relation to the wall of the cup the rubber will rise about the yarns as they are pulled through the cup, due to the circular movement of the rubber caused by the revolving parts therein, whereas if the yarns passed through the center of the cup the level of the rubber therein would be lowered around the yarns, caused by the circular action of the rubber making a vortex around the revolving parts. This cover is shown in Figs. 5 and 4ᵇ.

To prevent a knot tied in any one of the yarns from catching in the opening in the twist holder and thus causing a breakage, the holder is separated centrally into four steel segmental parts 46, 46, radially adjustable in guiding slots 52, 52, in a circular plate 53, as shown in Figs. 11 and 16. The inner ends of these parts 46, 46, are cut away at 90° to closely engage each other. The plate 53 is integral with the tube 54 which is inserted in the sleeve 49. The inner end of each segmental part 46 is vertically grooved so that when they engage with each other the central opening 47 formed thereby will be circular. This opening 47 is bell mouthed and is tapered downward to about the diameter of the twisted thread desired to be produced. The segmental parts are preferably formed of hardened steel and the walls of the hole 47 are highly polished. These steel parts are elastically connected together by means of a circular coiled spring S which engages pins P, P, upon the steel parts or segments. The ends of the spring are attached to one of these pins. The steel segmental parts 46, 46, are slidingly mounted in the radial slots 52, 52, and are retained therein by means of sector shaped plates 55, 55. This construction permits a knot or any other obstruction upon a yarn to press outward the segment which it touches and when the knot or obstruction has passed the spring will return the segment to its normal position.

In the process of threading the machine holders H, H, are employed to temporarily retain the yarns, while they are being threaded through the guide tubes 38, 38.

The instrumentalities for automatically stopping the machine when a yarn or the thread breaks and for sounding an alarm are constructed as follows:—as shown in Figs. 12, 13, 14 and 17. Attached to the hollow rod 42′ which holds the twister plate, is a sleeve 80 for fiber or other insulation which has four slots 81, 81 extending from the outer circumference toward the center, through which pass the four strands before they reach the twister former. On the upper part of this sleeve are secured the sections 82, 82 of a bronze or copper sleeve extending above the upper part of the fiber sleeve, leaving an empty space 83 between the rod and these sections. In this space free to move outward from the rod to make contact with these copper or bronze sleeve sections are four V shaped copper or bronze blocks 84, 84, respectively secured to the bottom end of four extremely thin spring metallic conductors 85, 85, whose upper ends are secured to the hollow rod 42. The yarns pass downward in the slots of the V shaped blocks. Thus these four blocks tend to fly outward from centrifugal force when the tube holder rotates rapidly and are restrained from so doing only by the yarns, which pass downward under a predetermined tension through the slots in these blocks. The centers of these blocks are radially in line with the slots in the copper or bronze sleeve sections and with the slots in the fiber sleeve. In this inner space 83 next to the rod the four bronze or copper sections are electrically connected together for the passage of an electric current. Touching the outer circumferences of these copper or bronze sleeve sections, is a bronze or copper flexible flat spring rod 65, whose other end is secured to a hinge pin 87 which rotates in a flanged fiber bushing 88 in the head of an eyebolt 89 which is screwed into the gear guard 89′ on the machine. This hinge pin is thus insulated from the machine. This hinge pin 87 on its lower end carries a helical spring 60 which is under compression between the bottom of the flanged fiber bushing before mentioned, and a nut 61 on the hinge pin. This makes the spring rod 65 stationary in any position it may be placed. This hinge pin is connected in an electric circuit with the coil C of an electromagnet. (See Fig. 1.) The other end of the magnet coil is connected to one terminal of a battery B and the other terminal of this battery is connected to the machine thus grounding the current in the machine. An electric circuit is completed through the electromagnet when a strand breaks while the machine is in operation, by the little V shaped blocks previously mentioned, which fly outward and touch two of the bronze sleeve sections. The core or armature 62 of this electromagnet is pivotally connected to a lever 63 which is mounted on a bracket 64 attached to the twisting machine frame. A downward lip 65 on the under side of the short element of this lever engages with a corresponding lip 66 projecting upward from an arm fastened to the belt shifting handle 120. These lips are of hardened steel to prevent excessive wear, are only engaged by a small surface so that a short movement of the end of the longer element of the lever to which the plunger is attached suffices to disengage these lips. The latter are held in engagement by the action of the helical spring 67, encircling the plunger stem, one end resting on the washer 68 next to the magnet coil and the other end pushing upward on to the upper end of the core 62 and pivoting pin 69. The belt shifter handle 120 is secured to a shaft 119 on which it swings freely.

Under the belt shifter handle 120, but moving in a parallel plane therewith is located a bell crank lever 121 mounted on a bracket 122 by a pin 123, and the bracket is attached to the twisting machine. To one end of this bell crank lever is attached a powerful helical spring 124, the other end of which is attached to a pin 125 driven into the twisting machine frame. To the other end of this bell crank lever is attached a flanged pin 126 one end extending upward and engaging in a slot 127 in the belt shifter handle and the other end extending downward through a slot in the bell crank lever 121, held in the position desired by a nut 128, thus giving an adjustment to the amount of throw. It will thus be seen that when a thread breaks during the operation of the twisting machine an electric current is set up in the electromagnet C the plunger is pulled downward, the belt shifter handle 120 is released by the induced movement of the magnet core 62 and lever 63, and the bell crank lever moves the belt shifter handle to its limit through the pull of the bell crank lever spring, thus shifting the belt from the driving pulley to the loose pulley, while the same movement of the belt shifter handle applies power to the band brake 16 thus stopping the machine. This operation is shown in Figs. 2 and 19 where 71 is the shifting fork, operatively connected with the shaft 119. The shaft 119 rocks by the movement of the shifting lever 120 the short arm 400 (see Fig. 4ᶜ) and is provided with a pin 401 which moves in a slot 402 in a lower forked arm 403. The fork in this arm engages a pin 404 in the sliding bar 405 to which the shifter fork 71 is secured.

The brake is operated as follows: When the belt shifter fork 71 and bar 405 and pin 404 are moved to shift the belt the pin 604 adjustably secured in a bell crank 421 is operated by the forked end 420 of the shifting lever 120, and the ends of the brake band 16 are respectively secured to the arms 605 and 606 of the bell crank 421 and shifting lever 120, and thus when the belt shifter handle operates to throw the belt on to the loose pulley the brake band is tightened around the flange 11' of the rotating head 11. (See Fig. 2.)

It is also essential to stop the machine when one of the tubes of yarn becomes empty or nearly so. The following parts have been provided for this purpose. In a radial line with each tube of yarn a vertical pin 406 or contact rod, projects through a hole in the upper flange 11' of the tube holder 11, and a short horizontal arm 407 on the upper end of the rod engages against the bottom of the yarn on the tube through a slot 408 in the felt cushion upon which the tube of yarn rests, while the outer end of this horizontal arm penetrates a vertical slot 409 provided in a preferably paste board tube upon which the yarn is wound. This contact rod extends downward through the flange 11' of the tube holder and is provided lower down with a shoulder 410 against which rests one end of a helical spring 411 under compression. The other end of the spring rests on the top of one of the four insulating blocks 412, spaced around the brake band flange 15 of the tube holder. Each of these four blocks 412, 412 are drilled out to receive the lower end of a contact rod 406 and is also slotted outward from this drilled hole at 413 to permit the upward movement of a pin 414 extending horizontally outward in this slot from the contact rod. A contact ring 415 of copper or other suitable material is fastened to the outer parts of and connects these insulating blocks and its lower part is vertically slotted at 416 to admit the passage of the contact pin 414 in the lower part of the slot 413. Resting against the outer part of this contact ring is a spring rod or contact brush 417, (see Fig. 2), mounted on a pin 418 pivoted in an eye bolt 420, whose eye is insulated by an insulated bushing 419. The lower end of this pin has a nut compressing a helical spring encircling the pin and resting the lower part of the insulating bushing similar in all respects to the one shown in Fig. 14. This causes the contact brush 417 to stay in any position it may be placed. This pin is electrically connected in circuit with the same electromagnet coil C and battery B as is the corresponding contact brush 65 for detecting the breaking of a yarn or yarns. Thus if a tube becomes empty or nearly so the contact rod 406 rises under the influence of the helical spring 411 encircling it and the contact pin 414 in its lower end makes contact with the band 415 surrounding the insulating blocks 412, 412 thus completing the electrical circuit through the brush 417 through the magnet and battery and thereby automatically stops the machine by the operation of the belt shifter and brake as before described and for the purpose herein set forth.

A signal bell K may also be included in the circuit of the battery B so as to sound an alarm when a yarn or yarns break or a knot pulls apart or any one of the tubes of yarn becomes exhausted or nearly so.

The mechanism for changing automatically the speed of the pulling drums relatively to the speed of rotation of the head containing the yarn tubes for the purpose of forming zones in the cord or thread which will recur at regular intervals and in which the number of twists per inch is different from the number of twists per inch in intermediate portions is constructed as follows: To give the variations in speed desired for the active thread pulling drum relatively to the speed of the operating shaft 8, large and small spur gears 200 and 201 are sleeved upon said shaft 8, each having clutch teeth upon their adjacent faces at 202 and 203 respectively. Between these spur gears is slidably mounted upon the same shaft a clutch 204, having clutch teeth 205 and 206 upon its outer faces, adapted to engage alternately with said spur gears, and engaging with the spline 207, whereby it is caused to rotate with the shaft 8 of the friction disk or other suitable driving mechanism. Upon the shaft of the active pulling drum 9 are keyed the small and large spur gears 208 and 209 respectively. The large gear 209 engaged with the small gear 201 upon the shaft 8 of the friction disk, or other suitable driving mechanism, and the gears 200 and 208 also engage with each other. The gears 200 and 201 are driven gears and hence the speed of the pulling drum 9 is varied according to the relative diameters of the gears which drive it, the direction of movement being always the same. The clutch disk is operated to engage with the gears 200 and 201 alternately by means of a clutch fork 210 provided with diametrically opposite pins 210', which engage the annular slot 211 therein. This clutch fork is hinged at 212 for a swinging movement upon a bracket 213, secured upon the stud 213' which supports the idler thread pulling drum. The clutch is operated by the following automatically acting mechanism. 214 is a clutch fork lever which is secured to a shaft 215, to which also a shifting lever 218 is secured. The clutch fork lever is provided with a pin 216 engaging a slot 217 in the fork 210 so that when the shifting lever rotates through a small arc the clutch fork will be moved to shift the clutch 204 so as to engage one or the other of the clutch gears 200 or 201. The shifting lever shaft 215 extends in a direction transverse to the axis of the clutch gears mentioned. The shifting lever 218 is provided with a yielding extremity or shoe 219 which is longitudinally movable in the shifting lever and is placed constantly under the pressure of a spring 220 within the lever. A cotter or pin 221 in the shank of the shoe extends through a slot 222 in the lever and prevents the spring from throwing out the shoe. The shifting lever 218 is engaged by a double dog engaging lever having two arms 223 and 227. This double lever operates the shifting lever 218 to throw the clutch 204 so as to engage the gear 200 and give the highest rate of speed to the active thread pulling drum 9. Alternating with the action of this double dog engaging lever the reversing lever 224 engages the shoe 219 and acts to reverse the movements of the shifting arm clutch, to give the lowest speed to the active thread pulling drum. A single dog engaging lever 225 acts to operate the reversing lever. The levers 223 and 224 are provided with beveled ends e and e' which engage the shifting lever shoe when moving in one direction and push it in against the action of the spring 220 so as to pass by the shoe when moving in the other direction. The single and double dog engaging levers are mounted loosely on a common pivot shaft 226. The double dog engaging lever is provided with a long arm 227 and with the short beveled dog engaging arm 223. The single dog engaging lever 225 is provided with an extended toe 228 and pin 229 which enters a slot or opening 230 in the reversing lever 224 and by its movement rocks the reversing lever. The reversing lever is pivoted on the supporting bracket 231 and 231' which is attached to the support for the friction disk bearing. These dog engaging levers are operated to move the clutch so as to alternately operate the pulling drum at high and low speeds, for a predetermined period of time, by means of the dogs 232 and 233, which are adjustably spaced upon the slowly rotating disk and worm wheel 234 so as to throw the shifting lever and shift the clutch twice in each revolution of the worm wheel. The relative speed of movement of the worm wheel to the speed of the friction disk and shaft 8 determines the amount of thread pulled through in one revolution of the friction disk. To this end the worm wheel 234 is operated by a worm or screw 235, and this in turn by the spur gears 236, 237, 238 and 239, which can be changed at pleasure to vary the relative rates of speed of the shaft 8 and worm wheel. The gear 236 is secured to the friction disk shaft and rotates therewith. The dogs 232 and 233 are adjustably secured in slots 240 and 244 respectively which are placed on opposite sides of the worm wheel 234, so that each can engage its particular lever without interfering with the action of the other. In this manner the dogs can be placed on the disk at any relative angle so as to increase or diminish the period of time elapsing between the movements of the clutch and thereby control the speed of the pulling drum, to produce the described differently twisted zones in the thread. The dogs are adjustably retained in their slots by means of the screws F having heads which engage the dovetail edges G of these slots and nuts 240'. The dog levers 223 and 224 are provided with return springs 241 and 242 respectively, (see Figs. 7 and 8), which return them to their normal position when inactive. These springs are secured to the levers and to the bracket 231. The operation of this portion of the device is as follows: When the friction disk 7 is rotated by the friction roll 6 the worm 235 and worm wheel 234 are also rotated through the train of gears 236, 237, 238 and 239. As the worm wheel rotates in the direction of the arrows as shown in Fig. 6, the dog 232 thereon has just commenced to engage the long arm 227 upon the double lever, while the clutch 204 is engaging with the small slow gear 201 on the friction disk shaft 8 and is kept in engagement therewith by the reversing lever 224, which is then holding back the shifting arm 218. The reversing lever is held in this position by the action of the pin 229 upon the toe 228 of the single dog engaging lever 225 secured upon the same shaft as the reversing lever 224, and at that time controlled by means of the spring 242. As the worm wheel rotates the dog 232 reaches the position shown in Fig. 9ª, where the long arm 227 of the double lever is seen at the point of disengagement from the dog 232. During this movement the beveled end e of the short arm 223 of the double lever has engaged and raised the shoe 219 on the shifting arm so as to permit the outer end of the reversing lever 224 to pass under it to its extreme position to the right under the influence of the spring 242. This places the single dog engaging lever 225 in position to be acted upon by the dog 233 on its own side of the worm wheel. By the time the dog 232 is in the position ready to release the double dog lever as shown in Fig. 9ª the short or shoe operating arm 223 has passed beyond the shoe and the shoe has been forced outward behind it by the action of the spring 220 in the shifting arm 218. Through the action of the spring 241 the double lever is then returned to the position shown in Fig. 18 and being in engagement with the shoe forces the shifting arm 218, over, so as to throw the clutch to engage with the high speed gear 200. As the worm wheel continues rotating, the dog 233 on the other side being in engagement with the single dog engaging lever 225 will move it into the position shown in Fig. 19 in which position the shifting arm is ready to return and shift the clutch back to the slow speed gear 201. During the movement of the single dog engaging lever described, the outer end of the reversing lever has passed under the shoe and is now ready to operate it on its return movement. In passing under the shoe the bevel face e' of the reversing lever has pushed back the shoe thus permitting the short arm 223 of the double lever to pass under it, when it will be returned to its original position against a step 243, which is common to both of the dog engaging levers, by means of the spring 241. The double dog lever is then in position to be engaged again by the dog 232 in turn. By the time the dog 233 releases the single dog lever the reversing lever has passed beyond the shoe and the shoe is projected into its path, so that by the action of the spring 242, and single lever and its toe, the reversing lever will be returned and will engage and throw the clutch shifting lever to operate the slow gear 201 again as shown in Fig. 6.

The number of revolutions of the disk shaft 8 relative to one revolution of the worm wheel determines the total length of the two zones in a definite length of the cord or thread and if a greater length for these zones is required the gears can be changed so as to cause a greater number of revolutions of the friction disk shaft to one revolution of the worm wheel, if a still greater length is required a new worm wheel and worm can be substituted therefor, in which the worm produces a slower movement of the worm wheel. A shorter length of the two zones can be obtained by a reverse process. To change the number of twists per inch in each zone proportionately the friction roll 6 is moved outward or inward from the center of the friction disk 7 according as a greater or less number of twists per inch are desired. The number of twists per inch can also be changed by changing the ratio of the clutch gears to the gears they respectively mesh with. The length of each zone, that is the length of each portion of thread that has a certain number of twists per inch, is governed by the angular distance apart of the two dogs on the worm wheel. Thus if the angular distance apart of the face of the dogs is small the length of the zone of thread which is made in the interval between the dogs acting on the dog levers is short, while the other zone is correspondingly long. While on the other hand if the angular distance between the face of the dogs is large, the zone of thread made during that interval is long, while the corresponding zone is short. In the first case of the dog on the worm wheel which engages the double dog lever is a small angular distance ahead of the other dog, (according to direction of rotation) the large clutch gear will be in operation only during the interval till the other dog reverses the mechanism throwing the small clutch gear in mesh thus making a short zone of a small number of twists or turns per inch, and a long zone of a larger number of twists or turns per inch. On the other hand if the angular distance apart of these same dogs is large, the zone of thread of a small number of twists per inch is correspondingly longer, while the zone of threads of a large number of twists per inch is correspondingly shorter. This mechanism for forming a zone thread is a unit in respect to the fact that all the parts are attached to a friction disk bracket I, which can be removed and another friction disk bracket for making a non-zone thread put in its place to which there are no speed changing devices attached. It is obvious that by changing the worm and worm wheel from right hand to left hand and by changing the direction of rotation of the rotating head 11 the mechanism may be operative for a right or left hand twisted cord or thread.

The thread after leaving the thread drums 9 and 10 passes over a guide wheel 250 which is rotatably mounted on a guide wheel fork 251 (see Figs. 23 and 24), which is adjustably secured to a rod 252 so that the guide wheel can be set at different angles. This rod is in turn secured to a bracket 253 so that it can be turned to any position required or moved in or out by loosening the set screw 254, which clamps together the split bearing of this bracket. On the opposite end of the aforesaid rod is adjustably secured another guide wheel fork 255 and guide wheel 256. The thread passes off this last guide wheel and then down through an opening in the hinged covers of a tank 257 for rubber or other coating material, (see Fig. 6ᶜ), to the grooved drums 258 and 259 similar to the thread drums 9 and 10, but having the grooves all of the same diameter. These drums are rotatably mounted upon pins 260 (see Fig. 6ᶜ) secured to the rubber tank standard 261 upon which the rubber tank is vertically and adjustably mounted. The rubber tank is secured in the desired vertical position by a set screw 262 in the bearing. The rubber tank has two hinged covers 263, 264, parting on peculiar lines, to allow the thread to leave the rubber cup at a different position from the center line than it entered, caused by the thread passing around the two little thread drums 258 and 259 continuously like a belt. At the point on the covers where the thread leaves the rubber tank passing vertically upward is a large opening 265, with high sides, to catch the surplus liquid rubber or other coating material, which adheres to and permeates the fibers of the cord or thread while passing around the drums in the rubber tank which contains this coating or permeating material or both, and in which the undesired surplus of material is removed in passing through rubber coating fingers 266 and 267 above. These fingers have a bell mouthed hole 268 on the under side tapering to about the size of the cord or thread, this hole being half in one finger and half in the other, these fingers being each pivotally mounted upon a pin 269, secured to the coating tank standard and being held together by a helical spring 270 attached to a lug on this lower part. Thus when a knot or other obstruction is about to pass through these fingers they will separate against the action of the spring 270 which immediately closes them after the obstruction has passed. After passing through these fingers the cord passes over a guide wheel 271 rotatably mounted upon a pin secured to the coating tank standard 261 and parallel to the cord in the coating tank. Passing over this guide wheel the cord passes downward around a guide wheel 272 set in a plane at right angles to the plane of the preceding guide wheel. The coating tank standard is supported by a bracket 273 attached to the base plate of the twisting machine and is adjustable therein, being secured in the required vertical position by a set screw E.

After leaving the last named guide wheel the cord passes downward to another guide wheel 274, in the same plane rotatably mounted upon a pin secured to a thread carrier 275 transversely movable across the front of the reel 276. From this guide wheel the cord passes vertically upward and over a guide wheel 277 in a plane at right angles to the former, and thence downward on to the thread reel 276. The thread reel consists of two spoked wheel rims 276, 276, with long hubs 278, the latter secured on the same shaft 280 being both keyed to this shaft 280, this latter resting in U shaped slots 279, in the bearing bracket 281 so that the reel may be readily lifted out. The shaft extends outward on one side of this reel and to this shaft is keyed a disk 282. Against this disk rests a thick washer 283 of leather or other suitable material and against the latter another disk 284 free to turn on the shaft but whose face is wide enough to be used as a pulley. Next is another washer 285 of leather, next another disk 286 of iron or steel, next a strong helical spring 287 and finally a nut 288, so that when the nut is tightened against the spring the pressure is transmitted through the disks and causes the pulley disk to be compressed between the leather washers and disks on each side, therefore a belt 290 from a pulley 291 on the driving shaft 289 put on the pulley disk will rotate the reel. The two pulleys or rims constituting the reel 276 are connected by eccentric rods 291, 291, set at the same distance outward from the center on each of the spokes. For a predetermined distance from the rims 276, 276, each rod is of the same diameter and has the same amount of eccentricity, while for the rest of the distance the rods are of the same diameter but of less eccentricity. These rods are free to turn in the reel spokes, but on the outside of one set of these spokes the rods extend and pass through locking disks 292, 292 attached to each spoke, these locking disks have V shaped teeth expanding radially on one side of each disk and meshing with these disks there are other like disks 293, 293, except that they are keyed to the rod but are free to slide lengthwise on the rod. Against these latter disks 293, 293 are nuts 294, 294 which when tightened force the disks together and prevent the rotation of the rods. At the extreme end each rod is squared off to take an ordinary wrench. The use of these eccentric rods permits one zone of the thread (having the greater number of twists per inch) as fast as made to be laid on the part of the rods having the greatest amount of eccentricity and the zone of cord or thread having the least amount of twist to be laid on the part of the rods having the least amount of eccentricity or vice versa. Then these rods may be afterward turned so as to stretch or relax the cord or thread after it is laid on the reel in the manner described according to the amount of elasticity required in the finished cord or thread. It is evident that when the thread carrier slides across the face of the reel the thread is laid on that part of the reel opposite where the thread carrier moves and the lengths of the eccentric parts of the rods on the reel are so determined that the thread is alternately laid first on one part and then on the other part, and has a reciprocating movement in front of each part, and moves intermittently the width of the thread during each revolution of the reel.

In Fig. 9°, Fig. 23, Fig. 24, Fig. 25, Fig. 26, Fig. 27, Fig. 28, Fig. 29, Fig. 30 are shown views of the preferred reel thread feeding device and means for operating the thread feeding carrier 275 which conveys the cord or thread from the automatic twisting machine to the reel. A plunger 295 is pivoted upon the thread carrier bracket 296 and a helical spring 297 under compression acts between the plunger head and the pivoted bearing 298 and is adjusted by a nut 299 acting on the plunger against the pivotal bearing. The plunger 295 is connected by a pin 300 to the long member of a T shaped lever 301 rotatably mounted on the end of the feed shaft 302. On this feed shaft two rods 303, 303' of rectangular section are free to move lengthwise in slots 303², 303², diametrically opposite. These rods move slightly below the surface of the shaft so as not to interfere with the movement of the shaft in its bearings 304, 304 on the feed shaft bracket, and one end of each rod 303 carries a pin 305 which engages in a slot 306 in one of the short members of the T shaped lever, and also each has ratchet teeth 307, 307' cut in its outer edges but the teeth are cut right hand in one rod and left hand in the other rod. The feed shaft 302 has a keyway 308 extending nearly its full length in which fits a key 309 in one of the bearings to allow a longitudinal but not rotative movement. On the other end of this shaft is a pin 310 extending diametrically through the shaft and engaging in a forked lever 311 which is operated by a link 312 conjointly with the movements of the worm wheel 234 as will be hereinafter described.

The thread carrier has two guide wheels 274 and 277 rotatably mounted in planes at right angles to each other, while one is in a vertical plane parallel to the feed shaft and so arranged that the thread from the rubber tank standard guide wheels passes from above down around its lower surface and vertically upward on to the other guide wheel and thence to the thread wheel as previously described.

The thread carrier moves on the feed shaft lengthwise, having a key 313 with a sliding fit in the keyway 308 on the shaft, and has two plunger pawls 314, 315, situated diametrically opposite each other whose hardened ends are fitted to engage the teeth 307, 307' in the ratchet rods 303, 303, on opposite sides of the carriage. Each of these plunger pawls has a shoulder 316 against which presses a helical spring 317, the other end of which engages a plug 318 screwed into the thread carrier, the plug being bored out to fit the stem of the plunger, while the spring keeps the hardened end of the plunger in contact with the ratchet rods. The outer stem of each of these feed carrier plungers is slotted at 318' to receive a rod 319 free to move horizontally in bearings 320, 320, on extended arms of the thread carrier. These rods are conically shaped at 322 at the points where they engage these plungers, but are reversely arranged. A set collar 323 with extended arms adjustable to receive the thrust of the plunger rods is located on each side of the thread carrier and determines the length of travel of the latter.

The carrier 275 is given a reciprocating movement, over the length of one section of the eccentric rods 291, 291 so as to lay one zone of the thread thereon. The movement of the carriage is not continuous but is moved forward the width of the thread or more for each revolution of the reel, so as to lay the thread smoothly thereon. This intermittent reciprocating movement is obtained by means of a lug 324 upon one side of the reel which engages the head of a plunger 295 against the resistance of a spring 297. This plunger is pivoted at 300 to the long arm of a T shaft lever 301, so as to rock it upon its pivot 300'. When the reel revolves so that the lug 324 strikes the plunger it will rock the T shaped lever and the rack 303 which is then in engagement with one of the plunger pawls, as 314 Fig. 38 will operate to move its carriage in the direction of its own movement as soon as the lug 324 has passed by the head of the plunger 295. The helical spring 297 will return the plunger and T headed lever to the reverse position, or place of starting, and in the mean time one or more teeth 307 of the rack mentioned will pass by the plunger pawl 314, and the plunger pawl will be engaged by a fresh tooth. This action will be repeated until the plunger rods 319 come into engagement with the set collar 323. By the action of the rods 319, 319' when they strike the collar 323 the plunger pawl 314 will be forced out of engagement with its rack, by the camming action of its conical portion, and the plunger pawl 315 will be released and thrown into engagement by the action of its spring 317, with its respective rack 303'. The action of this rack 303' will then reverse the movement of the carrier and so guide the thread to the reel as to cover the surface of the layer just laid in the reverse direction. When all that portion of the thread comprising one zone is laid the shaft 303 on which the carriage slides is moved over so as to position the carrier in front of the other side of the reel, ready to guide a second zone of thread thereto in a similar manner. When one zone of thread has been wound on the reel the forked lever 311 engaging the other end of the feed shaft 312 and the feed shaft and all attached parts are moved to the new position, the feed shaft sliding in the thread carrier bracket, and all the attached parts operate as before described in this new position, thus feeding the other zone of thread on to the other part of the thread reel.

The mechanism for operating the feed shaft and carriage from the worm wheel 234, to make its movements correspond with the movements of the drums 9 and 10 is as follows: The forked lever 311 is keyed to a vertical shaft 513 which is rotatably mounted in the lever bracket 514 and also carries a short arm whose extremity is jointed by a knuckle joint 515 to a link 312 which in turn has at its other end another knuckle joint 515′ connecting it to a bell crank lever 516 mounted upon a pin 517 secured to a bracket 518 fastened to the bed plate of the twisting machine, while the other end 519 of the bell crank lever 516 is so placed as to be acted upon by the dog 232 on the worm wheel 234 previously described, but at a time after the aforesaid dog engaging levers 225 and 223 have acted sufficiently for that part of thread previously made and in the twisting machine, between the twist holder and the thread reel, to be wound upon the latter. The arm 519 of the bell crank lever 516 as shown has a slot 520 in which engages a pin 521 secured to the toe 522 of the double arm lever 523 of which one arm is acted upon by the dog 233, on the other face of the worm wheel and whose other arm engages a helical spring 524 whose other end is fastened to a pin 525 in a line vertically below the shaft 526 upon which this lever rotates. The movement of this arm of the lever is such that it moves through an equal angle on each side of a vertical center line through this lever shaft 526, so the movement of this double arm lever caused by the dog 233 on that face of the worm wheel is against the action of the helical spring to the middle point of its travel and past that point the acting of the spring adds to the action of the dog, also the spring adds its restraining action against any movement of the levers, from any other source. The direction of movement of the arm 519 of the bell crank lever 516 is with the direction of rotation of the worm wheel when this lever is acted upon directly by the dog 232 on the worm wheel, but on the other hand when this lever is acted upon by the toe of the double armed lever 523 the movement is in the opposite direction. This movement and reverse movement occurs at exactly similar periods of time as the movements for changing the twist, but follows at a predetermined interval as previously explained. This movement and the reverse movement of these levers 516, 519 and 523 being transmitted through the link 312 to the shaft 302 moves the shaft 302 back and forth accordingly at predetermined intervals of time determined by the location of the dogs on the worm wheel.

After the yarns are twisted together to form the cord or thread they are drawn over guide wheels 183 and 184 and through the intermediate dust cover 185 to the pulling drums 9 and 10, which are grooved similarly to the tension drums for the yarns described, but are preferably tapered to give a better grip, to prevent the slip of the cord or thread against the resistance of the tension device for each tube of yarn on the rotating head 11, and thence may pass to a reel for storage in which they are preferably kept under tension for a predetermined length of time. The dust cover 185 is preferably hinged at each end at 186 to the supports 186′, 186′ of the guide wheels 183 and 184, and a catch 187 is preferably pivoted to each support 186′ to prevent the cord or thread from slipping off from each guide wheel.

A tension testing device upon the machine is a very essential part thereof. Since if a cord or thread proves on trial to be defective the tension of each component yarn can be tested while in the machine and if irregularity in tension exists which makes the thread defective, it can be discovered readily and rectified. A testing device for tension of the yarns is shown in Figs. 1, 2, 5$^a$ and 5$^b$, so that the exact pull on each one can be obtained prior to twisting the same into a finished cord or thread. This comprises the pulley 500 mounted upon a sliding block or sleeve 501, which moves upon a rod 502, and engages the spring 503. A previously calibrated scale 504 is placed at one side of the rod and a pointer 505 is secured to the moving block 501. The manner in which a yarn is tested is illustrated in Fig. 5$^b$. This testing mechanism is mounted on a support 506 convenient to the thread pulling drums 9 and 10.

It is obvious that when it is desirable to construct a cord or thread wherein a metal or fiber core is incorporated that the previously described needle and cap therefor in the bottom of the twist former must of necessity be removed and the space left thereby utilized for the passage of the aforesaid mentioned metal or fiber core. It is also obvious that the finished cord from one twisting machine can be led to another twisting machine and used as a core whereupon the additional yarns can be twisted or laid. The direction of rotation of the rotating head in the latter twisting machine is the reverse of that in the machine which made the cord or thread used as a core. This would necessarily mean the enlargement of the parts of the second twisting machine through which the core passed before being incorporated into a new multiple cord or thread and those parts of the second machine through and over which the cord or thread passed after being formed into a multiple would also need to be enlarged on account of its increased diameter. This action could be repeated in any desired number of machines to produce any desired number of layers of yarns upon a center core of metal or fiber as predetermined in a finished multiple cord or thread.

Having described the invention, what we claim as new and desire to secure by Letters Patent is:—

1. In an automatically acting machine for twisting and coating yarns to make a coated cord or thread a rotatable head provided with a lateral flange, yarn tube supporting means in said flange, a vertical central member for the head provided with a longitudinal central opening, a closure at the lower end of the opening, guide tubes secured in said closure and extending upwardly in said opening, a central tubular member in said inclosure, tension devices for said yarns mounted on said rotatable head, a twist forming member on the extremity of said central member, and rotatable with said head, said device provided with radial converging guide openings in its sides for the said yarns, a cup for coating fluid in which said twist forming member is immersed, a non-rotatable twist holder in said tank, provided with a central perforation through which all said yarns pass, pulling rollers for the finished cord or thread, and a common source of power for said rotatable head and pulling rollers.

2. In a twisting machine, in combination, a frame, a rotatable head thereon, supports thereon for yarn tubes on which yarn is wound, a pair of grooved tension wheels for the yarn on each yarn tube, a separate tubular guide for each yarn, in said rotatable head and rotatable therewith, a twist former rotatable with said head, a non-rotatable twist holder mounted in said frame and provided with a common central twisting opening for all said yarns, and a vertically adjustable support for said twist holder.

3. In a twisting machine, in combination, a frame, a head rotatable thereon and provided with a central opening, a series of supports for thread tubes spaced apart on said head about said opening, guide tubes passing through said central opening and rotatable with said head, a central tubular member in said head, tension devices for all the yarns rotatable with said head, a slotted twist former located below said rotating head and rotatable therewith, a stationary twist holder underneath said disk and adjustably spaced therefrom, the said twist holder formed in separable portions, elastically connected together, and having a central opening a portion of which is formed in each of said portions.

4. In a coating and twisting machine, a frame, a rotatable head thereon, supports for yarn tubes mounted thereon, a separate inclosing and covered chamber for each yarn tube, friction rolls for the yarns or said yarn tubes adapted to receive the yarns from said chambers, and rotatable with said head, guide tubes for said yarns passing through said rotatable head and rotatable therewith, a slotted twist forming member rotatable with said head through which said yarns pass to the twisting point, a stationary twist holder spaced from said slotted twist forming member, an adjustable support for said twist holder mounted in said frame, and a cup for coating material vertically adjustable on said twist holder support.

5. In a twist holder, a supporting disk having a central opening, segmental portions mounted on said disk and inclosing a common vertical central opening, and radially separable from each other, and means for elastically securing said segments together.

6. In a twist holder, a disk having a central opening, separable segments slidingly movable thereon, and inclosing a common central opening, and an elastic member adapted to resiliently connect said segmental portions together.

7. A twist holder comprising a tubular support, separable segmental portions mounted on said support and composed of hardened metal and having on their meeting faces longitudinal grooves forming together a common central opening when the two portions are brought together, means for slidingly securing said grooved portions upon said support, and a resilient connection between said portions.

8. In a machine for twisting and coating yarns to form a twisted thread, a frame, a rotatable head thereon having an extended flange supports for thread tubes thereon, chambers in which said yarn tubes are inclosed, said chambers provided with outlet guide openings for the yarns from said yarn tubes, a pair of tension rolls for each yarn, a rotatable slotted twist former adapted to converge the yarns to the twisting point, a bath of coating fluid and a twist holder provided with a central opening and immersed in said bath.

9. In a twisting machine, a frame, a head adapted to rotate thereon, a hollow stem in said head, a ball bearing for said head in said frame, a series of guide tubes for yarns in said hollow stem, a closure for the lower end of said stem in which said tubes are secured, a centrally located tube, said closure having perforations registering with the openings in said tubes, a tube extended downwardly from said closure in line with said central tube, a radially slotted twist former thereon through the slots in which the yarns are guided to the twisting point, a twist holder having a central opening, means for rotating said head, yarn tube supporting devices upon said rotating head, a pair of grooved tension wheels mounted upon said head for each yarn tube, a support for each pair of grooved tension wheels, said supports being arranged to receive the centrifugal thrust of said tension wheels as the head rotates means for adjusting the tension on said wheels inclosing chambers for said thread tubes, and reduced nozzles therefor adapted to guide the yarns therefrom to said tension wheels.

10. In a twisting and coating machine, a frame, a twisting head rotatably mounted therein, a hollow central stem therefor, an enlarged member in said head, supports for thread tubes spaced on said enlarged member on which yarns are wound, ball bearings for said twisting head upon said frame, a rotating means for said head, guide tubes within said stem for the yarns upon said yarn tubes, tension devices upon said stem for each yarn, a twist former provided with downwardly converging guide slots for yarns and secured upon the lower end of the central guide tube, a twist holder provided with a central perforation spaced from said guide member, a cup for fluid coating in which said twist holder is immersed, said cup vertically adjustable whereby it can be lowered to expose said twist holder above the level of the rubber, substantially as described.

11. In a twisting machine, a frame, a twisting head rotatably mounted thereon, means for supporting yarn tubes thereon, tension devices adapted to receive the yarns passing from said yarn tubes, a twist former provided with converging grooves through which said yarns are adapted to pass and rotatable with said head, a non-rotatable twist holder spaced from said twist former, and having a central opening through which all the yarns are adapted to pass while being twisted together, automatically operated pulling instrumentalities for the twisted thread and means for operating said head and pulling instrumentalities at predetermined relative rates of speed.

12. In a twisting machine, a rotatable head, a series of yarn tube holding devices, and a series of tension devices for yarns on said rotatable head, twist forming means rotatable with said head, a non-rotating twist holder, a pulling device, operating means for said rotatable head and pulling device, an open circuit, a brake, and automatic brake operating means controlled by the yarns, whereby when said circuit is closed said brake operating means will act to operate said brake, and to stop the machine when a yarn breaks.

13. In a twisting machine adapted to construct a cord or thread from yarns twisted together, a rotatable head, a brake therefor, means for operating the brake, said means electrically controlled, an open electric circuit in which said controlling means is situated, contacts in said circuit, one of said contacts adapted to be engaged by one of said yarns to hold said circuit open, said engaged contact adapted to fly outwardly to automatically close said circuit when released by said yarn.

14. In a twisting machine adapted to construct a cord or thread from yarns placed under a controllable tension, a rotatable head through which said yarns pass, a twist forming device and a twist holding device through which the yarns pass, an open electric circuit, a brake, a belt shifter, electrically controlled means for operating said brake and belt shifter when said circuit is closed, pairs of contact devices in said circuit, rotatable with said rotatable head, one of each pair of said contact devices adapted to engage resiliently with one of said yarns under tension whereby said contact device is held out of engagement with the other one of said pair, but makes contact therewith to close said circuit when released by the breaking of said yarn.

15. In a twisting machine for yarns, a rotatable twisting head, on which the yarns are placed, tension devices for the yarn in said head, a rotatable twisting means for the yarns, a rotatable pulling device, a frame upon which the rotatable members are mounted, a driving pulley and an idler pulley, and a belt shifting device, a brake device adapted to stop the movement of the machine, a belt shifter, a common operating arm and spring, for said brake device and belt shifter, a detent for said arm, an open electric circuit, a magnet and armature for said magnet adapted to release said detent, contact devices adapted to rotate with the said twisting head, some of said contact devices adapted to engage resiliently with said yarns while under tension, and hold open the circuit, but to engage the other contact devices and close said circuit when their respective engaging yarns are broken, whereby said detent is released and said spring moves said arm to operate said belt shifter and brake.

16. In a twisting machine in which a series of yarns are adapted to rotate under tension, a rotatable head rotating means therefor, electrically controlled stopping means therefor, an operating means for the stopping means an open electric circuit, means therein for controlling the operation of said operating means, and a pair of contact devices rotatable with each yarn, one of said contact devices in each pair adapted to engage its respective yarn, said contact devices in each pair adapted to engage with each other and close said circuit when said yarn is broken.

17. The combination with a rotatable twisting device for a thread, and a rotatable pulling device for the thread, of means for rotating said devices, of automatically acting means for changing the speed rotation of the pulling device relatively to the speed of rotation of the twisting device, at regular predetermined intervals.

18. The combination with a rotatable twisting device and a rotatable pulling device of change gears for operating said pulling device, and automatically acting means for alternately engaging said gears with said pulling device at predetermined intervals.

19. In combination with a thread twisting device, a rotatable thread pulling device, change speed gears for operating said pulling device, a clutch therefor, and automatically acting means for engaging said clutch alternately with said gears at predetermined intervals, to drive said pulley device at different rates of speed, and a common means for rotating said clutch and twisting device.

20. In combination with a rotatable thread twisting device, and a rotatable thread pulling device, change speed gears, adapted to operate said pulling device, a clutch adapted to alternately engage said gears, with said pulling device, means for rotating said twisting device, means for rotating said clutch and means for changing the relative speed of said clutch relatively to the speed of said rotatable twisting device.

21. In a twisting machine, in combination with rotatable twisting mechanism and tension mechanism, pulling rolls adapted to pull the thread against the resistance of the pulling mechanism, high and low speed gears adapted to drive the pulling rolls at different rates of speed, a clutch device for alternately connecting said speed gears operatively with said pulling mechanism, and automatically acting means for throwing said clutch at predetermined intervals to alternately engage said high and low speed gears.

22. In a twisting machine for a thread composed of yarns, tension devices for the said yarns, means for twisting said yarns together, means for pulling the twisted thread against the resistance of said tension devices, automatically acting means for changing periodically the relative rates of speed of the twisting and pulling means, and means for controlling the length of the thread comprised in the twisted zones produced in the thread by the action of the speed changing means.

23. The combination with twisting means, pulling means, and an operating shaft for said pulling means, of a clutch on said shaft, high and low speed gears on said shaft adapted to be alternately engaged by said clutch, corresponding gears operatively connected with the pulling means, a shifter arm for the clutch, a compressible shoe therefor, a worm and worm wheel operatively connected with said shaft, a pair of dogs spaced on said worm wheel, a lever adapted to be engaged by one of said dogs once on one revolution of said worm wheel, and an arm therefor adapted to engage said shoe and raise it to pass by the same, a return spring whereby the said arm will engage and shift the shifter arm on its return movement, a reversing lever adapted to raise the said shoe in passing and to engage with the shoe on its return movement, and a single arm lever adapted to be engaged by said second dog on said worm wheel, once in one revolution of said worm wheel, said single lever operatively connected with said reversing lever and a return spring for said single lever whereby when said second dog releases said single lever said reversing lever will engage and reverse the movement of said shifter arm.

24. In combination with pulling rolls, one of which is an idler and the other rotatable, a driving shaft, loose change gears thereon, and corresponding gears operatively connected with the rotatable pulling roll, a clutch for alternately engaging the separate pairs of rolls, a shifter arm therefor, a compressible shoe in the shifter arm, a disk operatively connected with said driving shaft, a dog adjustably secured on each side thereof, the angular distance between said dogs on said disk being adjustable, a lever having a dog engaging arm and having also an arm adapted to engage said shoe, when moving in one direction and to pass by the same when moving in the other direction, and to shift said shifter arm and clutch when said dog engages said dog engaging arm, a return spring for said lever, a second dog engaging lever adapted to be engaged by the dog on the other side of said disk, a reversing lever operatively connected therewith to move in the opposite direction and to engage and reverse the movement of said shifter arm said reversing lever, the outer ends of each shoe engaging members being beveled so as to raise said shoe to permit the other member to pass the same.

25. In a twisting machine for twisting yarns into thread and for reeling the same, automatically acting tension and twisting mechanism, pulling rolls for the thread, means for changing the speed of the pulling rolls at regular predetermined intervals to form zones in the thread in which the number of twists per inch is regularly varied, a reel upon which the thread from the pulling rolls is wound under controllable tension, said reel having a space for each zone in said thread, corresponding zones being laid together thereon, means for laying the thread on each zone space, and for alternately shifting the thread to the other zone space on the reel.

26. In combination with twisting and pulling mechanism, means for automatically changing the speed of the pulling mechanism to form zones in the thread at regular intervals wherein the number of twists per inch in one zone varies from the number of twists per inch in the other zone, a rotatable reel adapted to receive the thread from the pulling rolls, adjustable eccentric rods in said reel adapted to receive the thread, said rods having spaces on one side for one zone and on the other side for the other zone, a carriage reciprocable transversely of said reel and adapted to apply the thread separately to each zone space thereon, and automatically operating means for moving said carriage alternately to apply said thread independently to each zone space, and for then giving a reciprocating movement to the carriage across said space, said movement being in intermittent steps, of not less than the width of said thread.

27. In a twisting machine, a head adapted to rotate at a high rate of speed, means for securing yarn tubes thereon, said tubes being stationary on their axes, and chambers adapted to inclose said yarn tubes, the walls of said chambers formed in separable parts for the removal and insertion of said yarn tubes, one portion of each chamber secured to said rotatable head.

28. In a twisting machine for yarns, a head, a series of supports for yarn tubes thereon, a pair of circumferentially grooved friction rolls adjacent to each yarn tube, and inclosing chambers for said yarn tubes, the walls of each chamber separable for insertion and withdrawal of said tubes, and outlet guide tubes leading from said chambers and adapted to apply the yarn from each yarn tube to its respective friction rolls.

29. In a chamber adapted to inclose a yarn tube, a stationary wall and a movable wall hinged thereto, a support in said chamber in which said yarn tube is stationary on its axis and a conical tube leading from the top of said chamber, said conical tube being formed in a continuation of each wall, and means for securing the said walls in a closed position.

30. In a machine for twisting yarns together to form a thread, in combination, a rotatable twist former provided with openings converging downwardly toward the twisting point to serve as guides for the said yarns while twisting the same, a non-rotatable twist holder provided with a central opening, and a needle point centrally secured to said twist former said needle point adapted to extend into said central opening in said twist holder, the said yarns passing through the openings in said twist former and through said central opening in said twist holder, and forming their twisting point on said needle point, within the said central opening in said twist holder.

31. In a twist forming mechanism, a rotatable twist former, a needle point projecting centrally therefrom, said twist former provided with marginal slots converging toward said needle, a conical twist forming space adjacent to said needle, and a non-rotatable twist holder provided with a central opening into which said needle projects and upon which said twist is produced.

32. In combination a rotatable twist former provided with marginal slots converging toward its lower end and a non-rotatable twist holder provided with a central opening.

33. A rotatable twist former provided with guide slots, for yarns, a twist forming pointed extremity, and a non-rotatable twist holder provided with a central opening through which the twisted thread passes.

34. In a twisting machine for yarns, a rotatable twist former for said yarns, a twist holder, a bath cup for coating material for said yarns in which cup said twist holder and twist former are immersed, said twist holder located at one side of said cup adjacent to one wall thereof whereby the movements of the rotating twist former and yarns while being twisted will tend to raise the level of the coating material about them.

35. In a twisting machine, a rotatable head, thread tubes mounted thereon, a pair of circumferentially grooved friction rolls mounted on said head adjacent to each of said thread tubes and over which the yarn from said tubes passes, one of said rolls being fixed and the other rotatable, means for adjusting the amount of tension or resistance of the rotatable roll, a standard for each pair of rolls adapted to receive the thrust from the rotatable rolls as said head rotates and an anti-friction thrust washer for each rotatable roll, intermediate between said roll and its standard.

36. In a twisting machine for twisting yarns together to form a thread, means for holding the yarns under tension and for rotating the same, twisting mechanism for the yarns, a twist holder for pulling the twisted thread against the tension of the yarns, a rotatable part of the machine through which said yarns pass, spring contacts engaged by said yarns and contacts adapted to be engaged by the same when released by the breaking of said yarns, all said contacts being secured in said rotatable part of said machine, an electric circuit adapted to be closed by said contacts, electrically controlled mechanism for stopping the machine, an electric device in said circuit for operating said electrically controlled mechanism when said circuit is closed by the engaging of any two of said contacts.

In testimony whereof, we hereunto set our hands this sixth day of May 1910.

LAWRENCE A. SUBERS.
ERNEST MOSMAN.

In presence of—
S. L. EXLINE,
F. H. TOWNSEND.